(12) United States Patent
Zambetti et al.

(10) Patent No.: US 9,477,393 B2
(45) Date of Patent: Oct. 25, 2016

(54) DEVICE, METHOD, AND GRAPHICAL USER INTERFACE FOR DISPLAYING APPLICATION STATUS INFORMATION

(71) Applicant: Apple Inc., Cupertino, CA (US)

(72) Inventors: Nicholas Zambetti, San Francisco, CA (US); Chanaka G. Karunamuni, San Jose, CA (US); Imran Chaudhri, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 139 days.

(21) Appl. No.: 14/290,758

(22) Filed: May 29, 2014

(65) Prior Publication Data

US 2014/0365953 A1 Dec. 11, 2014

Related U.S. Application Data

(60) Provisional application No. 61/832,945, filed on Jun. 9, 2013.

(51) Int. Cl.
*G06F 3/048* (2013.01)
*G06F 3/0485* (2013.01)
*G06F 3/01* (2006.01)
(Continued)

(52) U.S. Cl.
CPC ............. *G06F 3/0485* (2013.01); *G06F 3/016* (2013.01); *G06F 3/0481* (2013.01); *G06F 3/0488* (2013.01)

(58) Field of Classification Search
CPC ..................................................... G06F 3/0485
USPC ....................................................... 715/784
See application file for complete search history.

(56) References Cited

U.S. PATENT DOCUMENTS 8,291,349 B1 10/2012 Park et al.
8,423,911 B2 * 4/2013 Chaudhri ............ G06F 3/04817
715/765

(Continued)

FOREIGN PATENT DOCUMENTS

GB 2 237 486 A 5/1991
WO WO 2011/100623 A2 8/2011

OTHER PUBLICATIONS

Wallen, "Five Useful Tips for Your Samsung Galaxy S III," TechRepublic, http:www.techrepublic.com/blog.smartphones/five-useful-tips-for-your-Samsung-Galaxy-S-III, Nov. 1, 2012, 12 pages.

(Continued)

*Primary Examiner* — William Titcomb
(74) *Attorney, Agent, or Firm* — Morgan, Lewis & Bockius LLP

(57) ABSTRACT

An electronic device with a display concurrently displays a device status region, and an application user interface that includes a content region and an application input field. While concurrently displaying the device status region and the application user interface, the device receives first input in the application input field. In response, the device concurrently displays respective content in the content region in accordance with the first input, and first text that corresponds to the first input in the application input field. While concurrently displaying the respective content and the first text, the device detects a second input that corresponds to a request to scroll the respective content in a first direction. In response, the device scrolls the respective content in the first direction, ceases to display the application input field, and displays, adjacent to the device status region, the first text.

48 Claims, 29 Drawing Sheets

(51) Int. Cl.
*G06F 3/0481* (2013.01)
*G06F 3/0488* (2013.01)

(56) References Cited

U.S. PATENT DOCUMENTS

| | | | | |
|---|---|---|---|---|
| 9,176,657 B2 * | 11/2015 | Tumwattana | ......... | G06F 3/0485 |
| 9,244,584 B2 * | 1/2016 | Fino | ......... | G06F 3/0485 |
| 9,274,695 B2 * | 3/2016 | Ellenich | ......... | G06F 3/0485 |
| 2008/0077880 A1 * | 3/2008 | Oygard | ......... | G06F 3/0485 |
| | | | | 715/799 |
| 2008/0165210 A1 | 7/2008 | Platzer et al. | | |
| 2009/0007014 A1 | 1/2009 | Coomer et al. | | |
| 2011/0117898 A1 | 5/2011 | Pereira et al. | | |
| 2011/0202834 A1 | 8/2011 | Mandryk et al. | | |
| 2012/0240041 A1 | 9/2012 | Lim et al. | | |
| 2012/0246593 A1 * | 9/2012 | Rauenzahn | ......... | G06F 3/0485 |
| | | | | 715/784 |
| 2013/0036382 A1 | 2/2013 | Yuan et al. | | |
| 2013/0055083 A1 * | 2/2013 | Fino | ......... | G06F 3/0485 |
| | | | | 715/716 |
| 2013/0117365 A1 | 5/2013 | Padmanabhan et al. | | |
| 2013/0125020 A1 | 5/2013 | Lee et al. | | |
| 2014/0181734 A1 * | 6/2014 | Jin | ......... | G06F 3/04883 |
| | | | | 715/786 |
| 2014/0317556 A1 * | 10/2014 | Ellenich | ......... | G06F 3/0485 |
| | | | | 715/784 |
| 2014/0362056 A1 | 12/2014 | Zambetti et al. | | |
| 2014/0365882 A1 | 12/2014 | Lemay | | |
| 2014/0365912 A1 | 12/2014 | Shaw et al. | | |
| 2014/0365919 A1 | 12/2014 | Shaw et al. | | |
| 2015/0007059 A1 * | 1/2015 | Zilmer | ......... | G06F 3/0485 |
| | | | | 715/753 |
| 2015/0205476 A1 * | 7/2015 | Kuscher | ......... | G06F 3/0485 |
| | | | | 715/784 |

OTHER PUBLICATIONS

Rakesh, "WiFi Direct is Better Than Bluetooth for Sharing Files Between Android Devices," http://www.droidviews.com/wifi-direct-is-better-than-bluetooth-for-exchanging-files-between-android-devices, Mar. 7, 2013, 12 pages.

Dutch Search Report, dated May 12, 2015, received in Dutch Patent Application No. 2012929, which corresponds with U.S. Appl. No. 14/290,973, 6 pages.

Dutch Search Report, dated May 12, 2015, received in Dutch Patent Application No. 2012928, which corresponds with U.S. Appl. No. 14/290,973, 4 pages.

International Search Report, dated Nov. 27, 2014, received in International Patent Application No. PCT/US2014/040398, which correponds with U.S. Appl. No. 14/290,973, 15 pages.

International Search Report, dated Feb. 23, 2015, received in International Patent Application No. PCT/US2014/038943, which correponds with U.S. Appl. No. 14/290,850, 16 pages.

* cited by examiner

DEVICE, METHOD, AND GRAPHICAL USER INTERFACE FOR DISPLAYING APPLICATION STATUS INFORMATION

RELATED APPLICATIONS

This application claims priority to U.S. Provisional Patent Application No. 61/832,945, filed Jun. 9, 2013, which is incorporated by reference herein in its entirety.

TECHNICAL FIELD

This relates generally to electronic devices with touch-sensitive surfaces, including but not limited to electronic devices with touch-sensitive surfaces that display application status information.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to view and navigate content on a display. For example, a user can view and navigate content in a web browser application on the device. The web browser application typically includes one or more areas adjacent to the web page content that display application information, such as a status/input bar/field.

Application status bars serve useful functions, such as accepting input and displaying information about the application content being viewed. But these bars can take up valuable screen space, leaving less space for the content that the user wants to view. Particularly on portable devices, on which screen space is at a premium, status bars that take up too much screen space can degrade the user experience.

SUMMARY

Accordingly, there is a need for electronic devices with more efficient methods and interfaces for displaying application status information. Such methods and interfaces optionally complement or replace conventional methods for displaying application status information. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices, optionally with touch-sensitive surfaces, are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at an electronic device with a display and optionally a touch-sensitive surface. The method includes: concurrently displaying, on the display, a device status region and an application user interface that includes a content region for displaying application content and an application input field for accepting input for the application; while concurrently displaying the device status region and the application user interface, receiving a first input in the application input field; in response to receiving the first input, concurrently displaying, on the display, respective content in the content region in accordance with the first input, and first text that corresponds to the first input in the application input field; while concurrently displaying the respective content in the content region and the first text in the application input field, detecting a second input that corresponds to a request to scroll the respective content in a first direction; and in response to detecting the second input: scrolling the respective content in the first direction, ceasing to display the application input field, and displaying, adjacent to the device status region, the first text.

In accordance with some embodiments, an electronic device includes a display unit configured to display concurrently a device status region and an application user interface that includes a content region for displaying application content and an application input field for accepting input for the application, and a processing unit coupled to the display unit. The processing unit is configured to: while concurrently enabling display of the device status region and the application user interface, receive a first input in the application input field; in response to receiving the first input, concurrently enable display of, on the display unit, respective content in the content region in accordance with the first input; and first text that corresponds to the first input in the application input field; while concurrently enabling display of the respective content in the content region and the first text in the application input field, detect a second input that corresponds to a request to scroll the respective content in a first direction; and in response to detecting the second input: scroll the respective content in the first direction, cease to enable display of the application input field, and enable display of, adjacent to the device status region, the first text.

In accordance with some embodiments, an electronic device includes a display, optionally a touch-sensitive surface, one or more processors, memory, and one or more programs; the one or more programs are stored in the memory and configured to be executed by the one or more processors and the one or more programs include instructions for performing the operations of any of the methods described above. In accordance with some embodiments, a graphical user interface on an electronic device with a display, optionally a touch-sensitive surface, a memory, and one or more processors to execute one or more programs stored in the memory includes one or more of the elements displayed in any of the methods described above, which are updated in response to inputs, as described in any of the methods described above. In accordance with some embodiments, a computer readable storage medium has stored therein instructions which when executed by an electronic device with a display and optionally a touch-sensitive surface, cause the device to perform the operations of any of the methods referred described above. In accordance with some embodiments, an electronic device includes: a display, optionally a touch-sensitive surface, and means for performing the operations of any of the methods described above. In accordance with some embodiments, an information processing apparatus, for use in an electronic device with a display and optionally a touch-sensitive surface, includes means for performing the operations of any of the methods described above.

Thus, electronic devices with displays and optionally touch-sensitive surfaces are provided with more efficient methods and interfaces for displaying application status information, thereby increasing the effectiveness, efficiency, and user satisfaction with such devices. Such methods and interfaces may complement or replace conventional methods for displaying application status information.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DETAILED DESCRIPTION

Figure 1A:
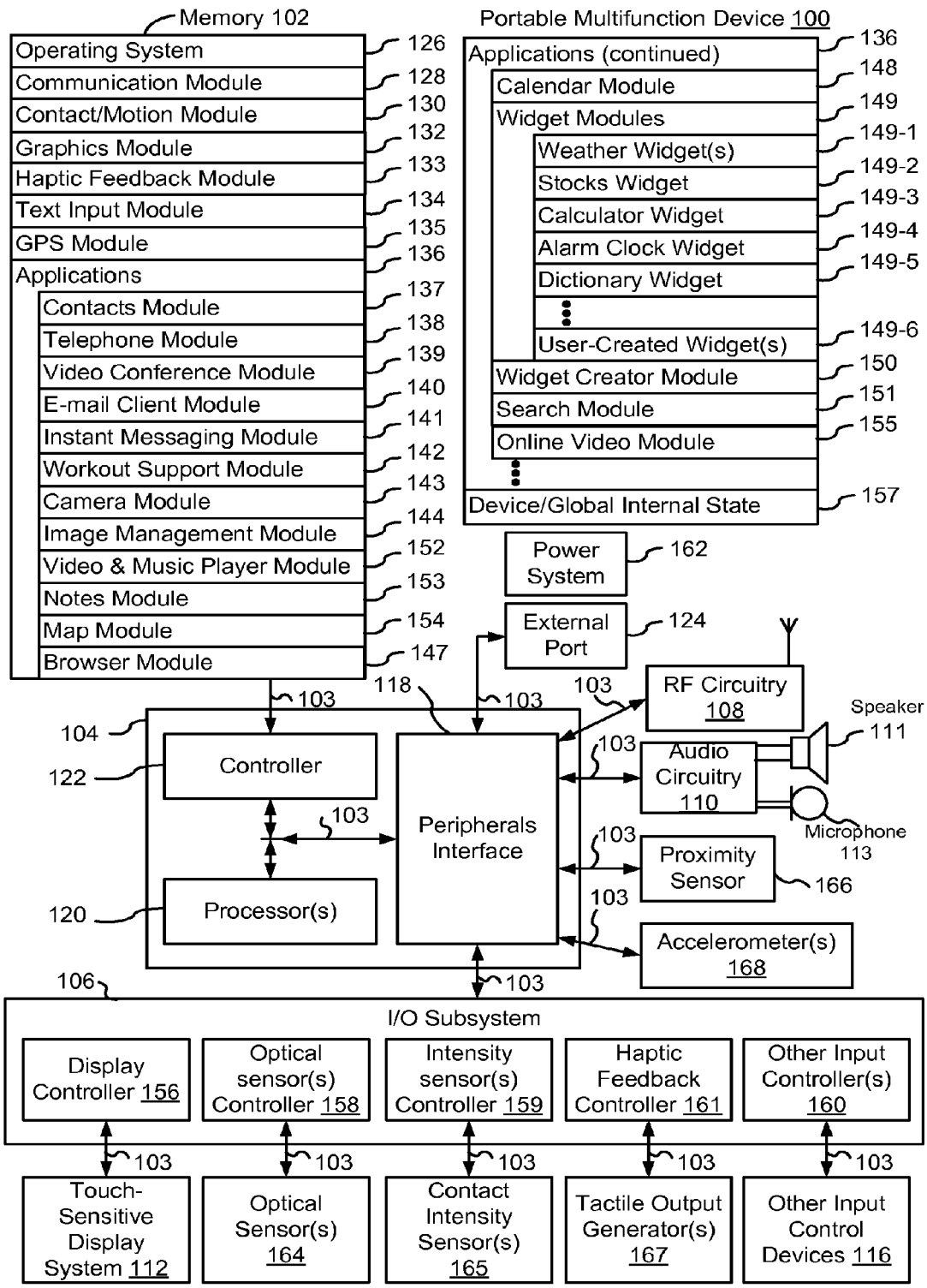
FIG. 1A is a block diagram illustrating a portable multifunction device with a touch-sensitive display in accordance with some embodiments.

Many electronic devices have graphical user interfaces that display application content (e.g., web page content). These user interfaces typically also include regions adjacent to the application content that display information or controls (e.g., status/input bars/fields for entering/displaying URLs or search terms). When these regions and application content are displayed concurrently, these regions take up screen space that could otherwise be used to display more of the application content. In the embodiments described below, such regions are reduced in size, or even cease to be displayed, in response to particular inputs, thus freeing up screen space to display more of the application content. For example, in response to an input to scroll the content, an input field ceases to be displayed and text that was in the input field is reduced in size and displayed next to device status information. The input field is re-displayed in response to a gesture that meets certain criteria. Thus, the input field in the user interface can be hidden, while still displaying some text from the input field at a reduced size to provide context, to free up more screen space for displaying application content. This improves the user experience and creates a more efficient man-machine interface.

Below, FIGS. 1A-1B, 2, and 3 provide a description of exemplary devices. FIGS. 4A-4B and 5A-5Q illustrate exemplary user interfaces for displaying application status information. FIGS. 6A-6E are flow diagrams illustrating a method of displaying application status information. The user interfaces in FIGS. 5A-5Q are used to illustrate the processes in FIGS. 6A-6E.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
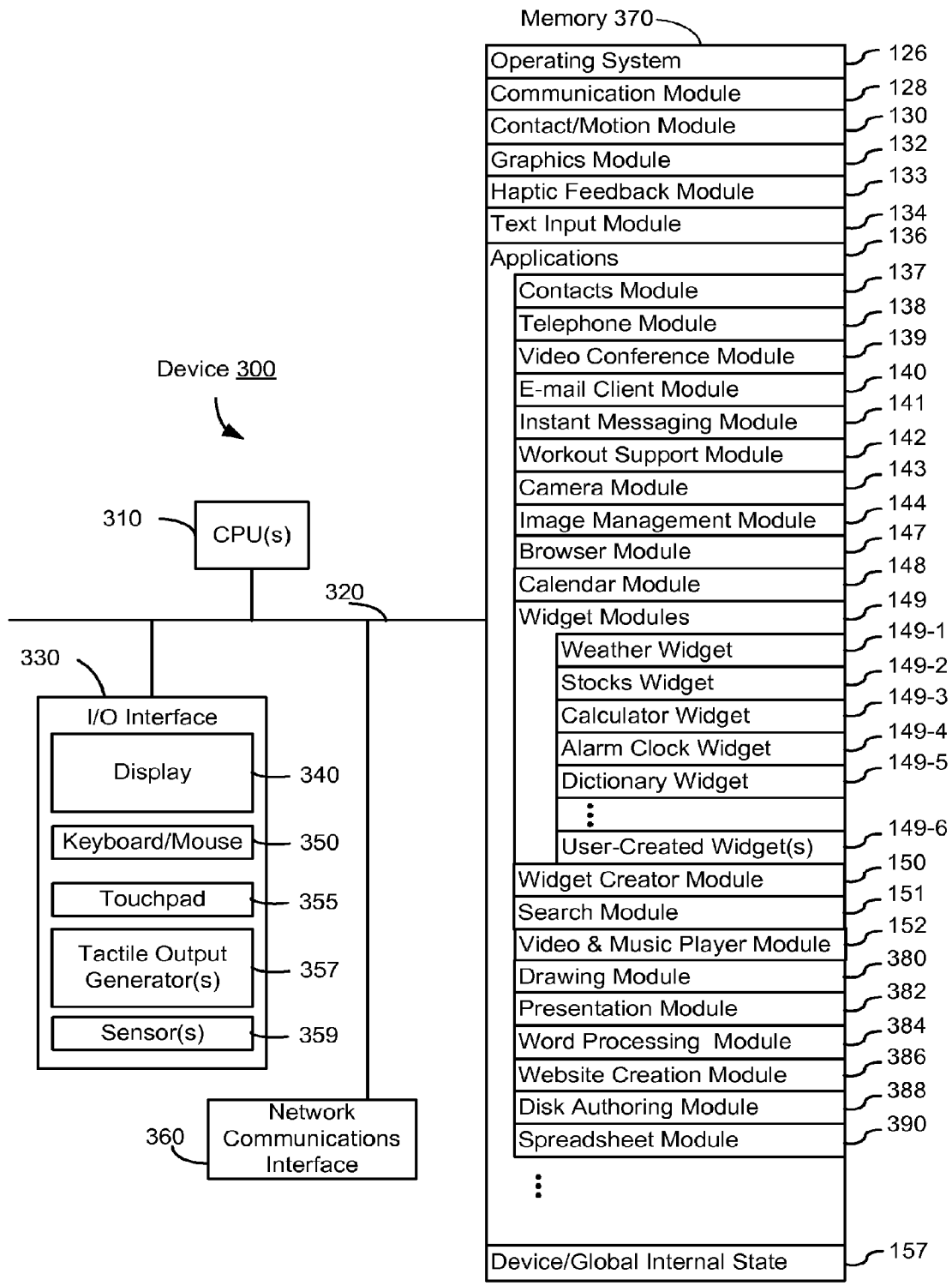
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of:

active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

widget creator module 150 for making user-created widgets 149-6;

search module 151;

video and music player module 152, which is, optionally, made up of a video player module and a music player module;

notes module 153;

map module 154; and/or online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
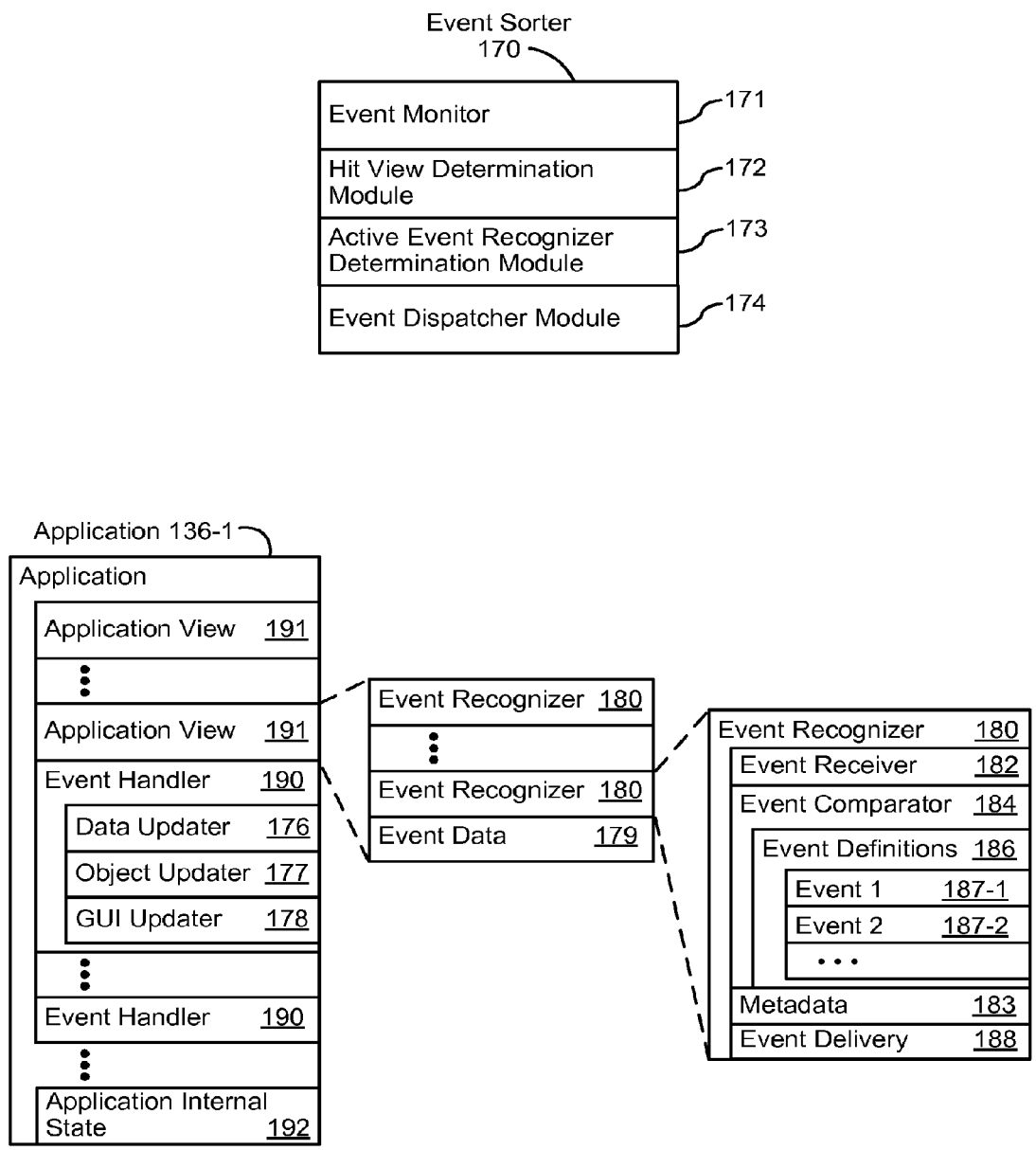
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-13, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
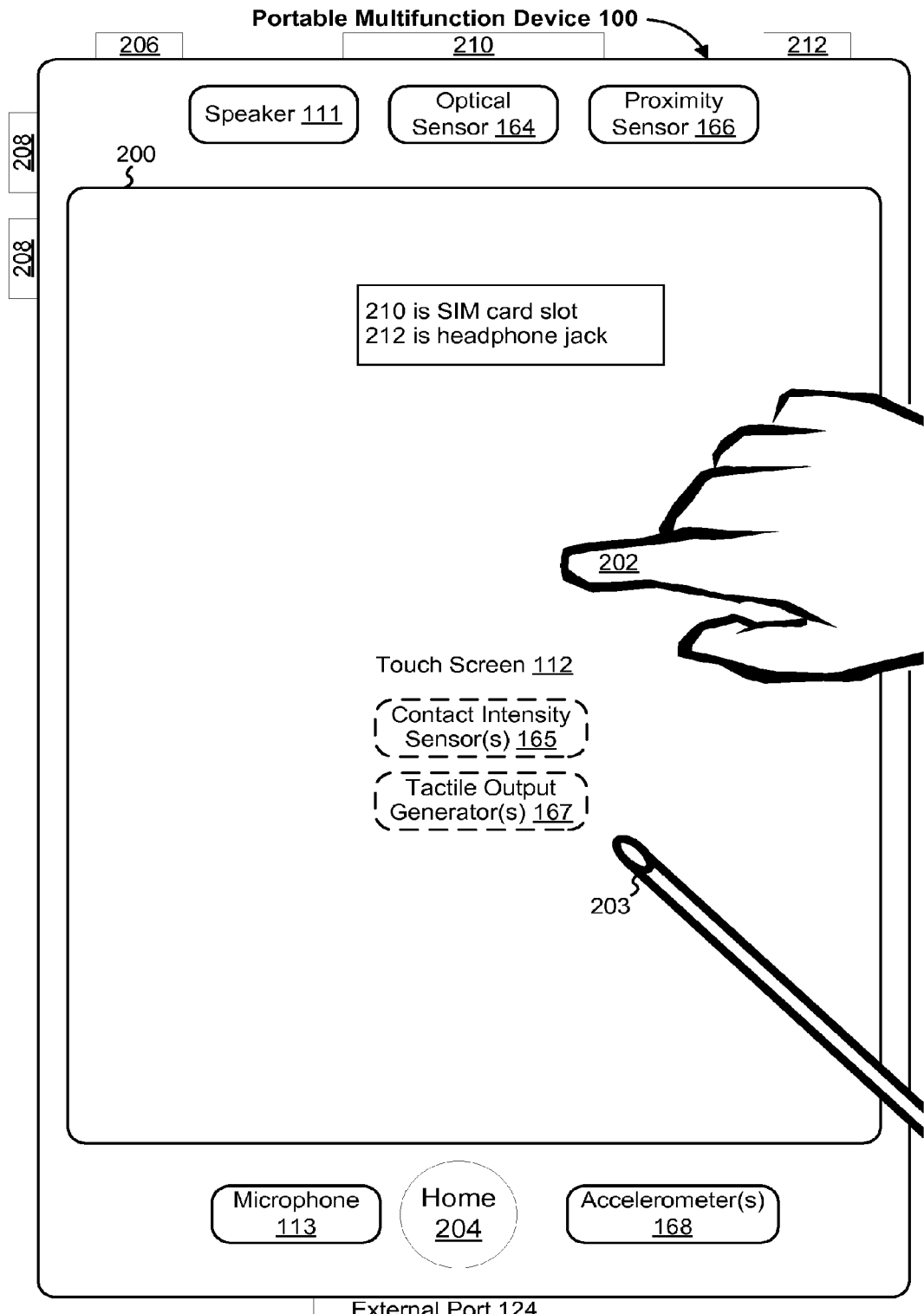
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (1/0) interface 330 comprising display 340, which is typically a touch screen display I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
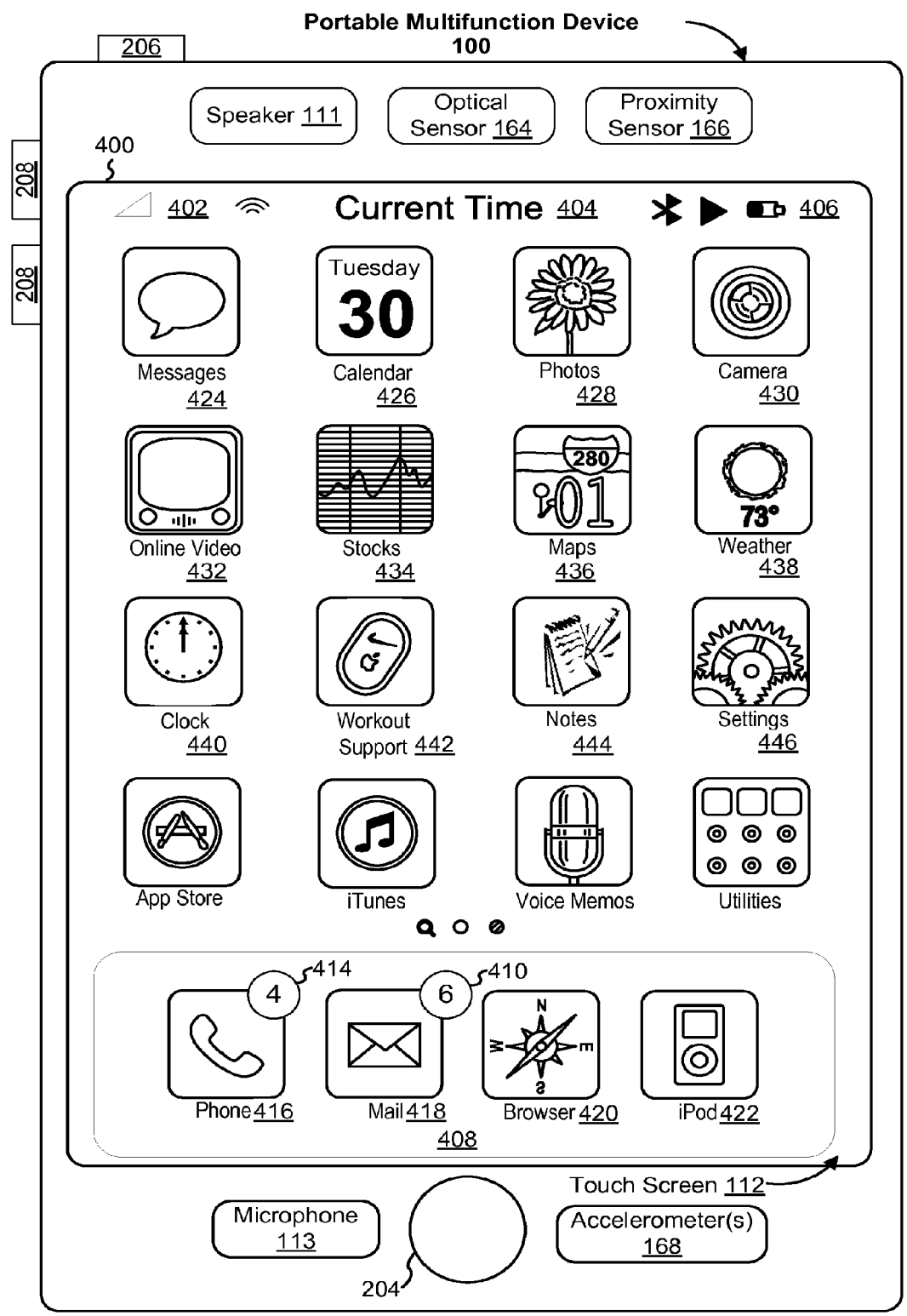
FIG. 4A illustrates an exemplary user interface for a menu of applications on a portable multifunction device in accordance with some embodiments.
Figure 5A:
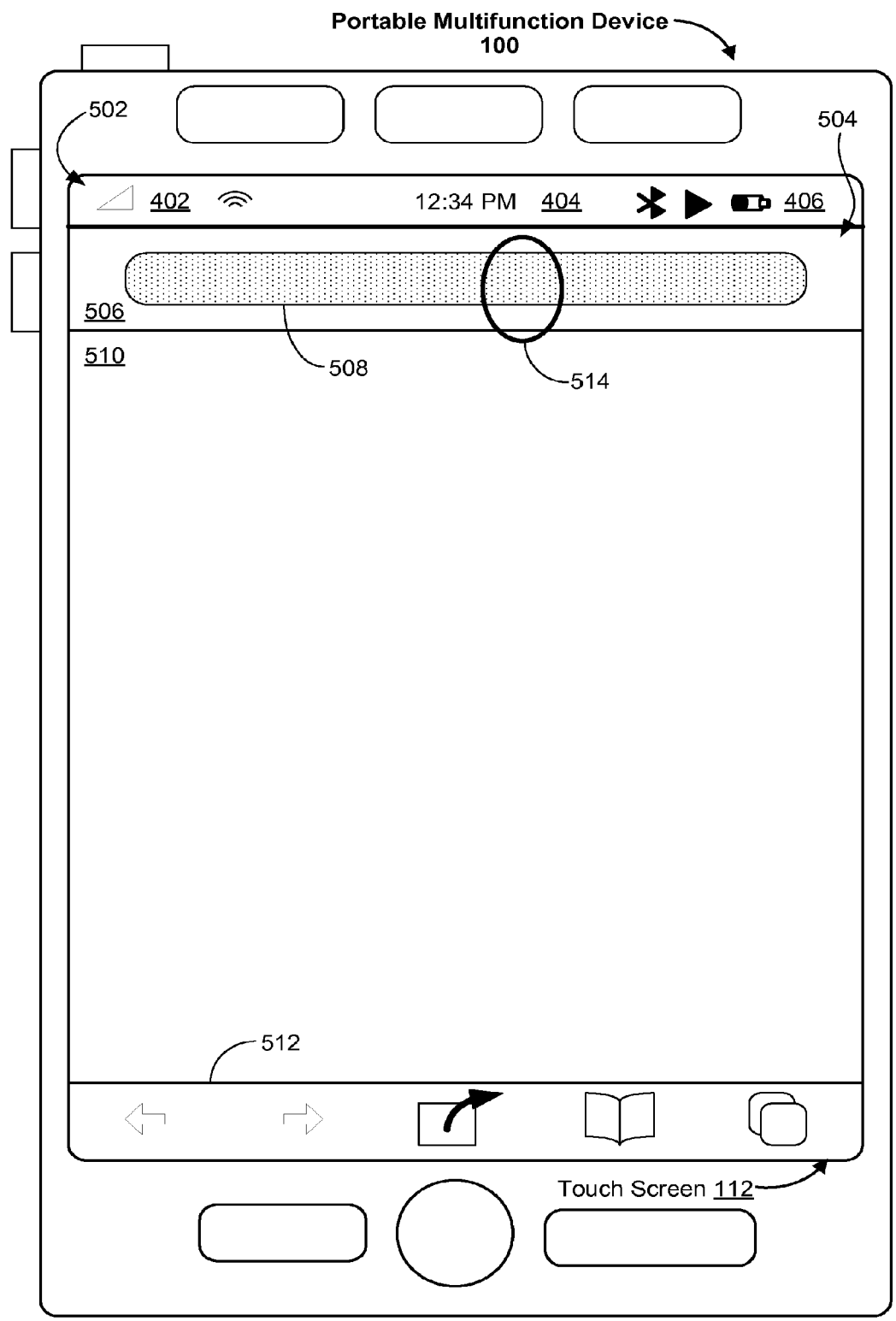
FIGS. 5A-5Q illustrate exemplary user interfaces for displaying application status information in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Text;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video"
  Icon 434 for stocks widget 149-2, labeled "Stocks;"
  Icon 436 for map module 154, labeled "Map;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
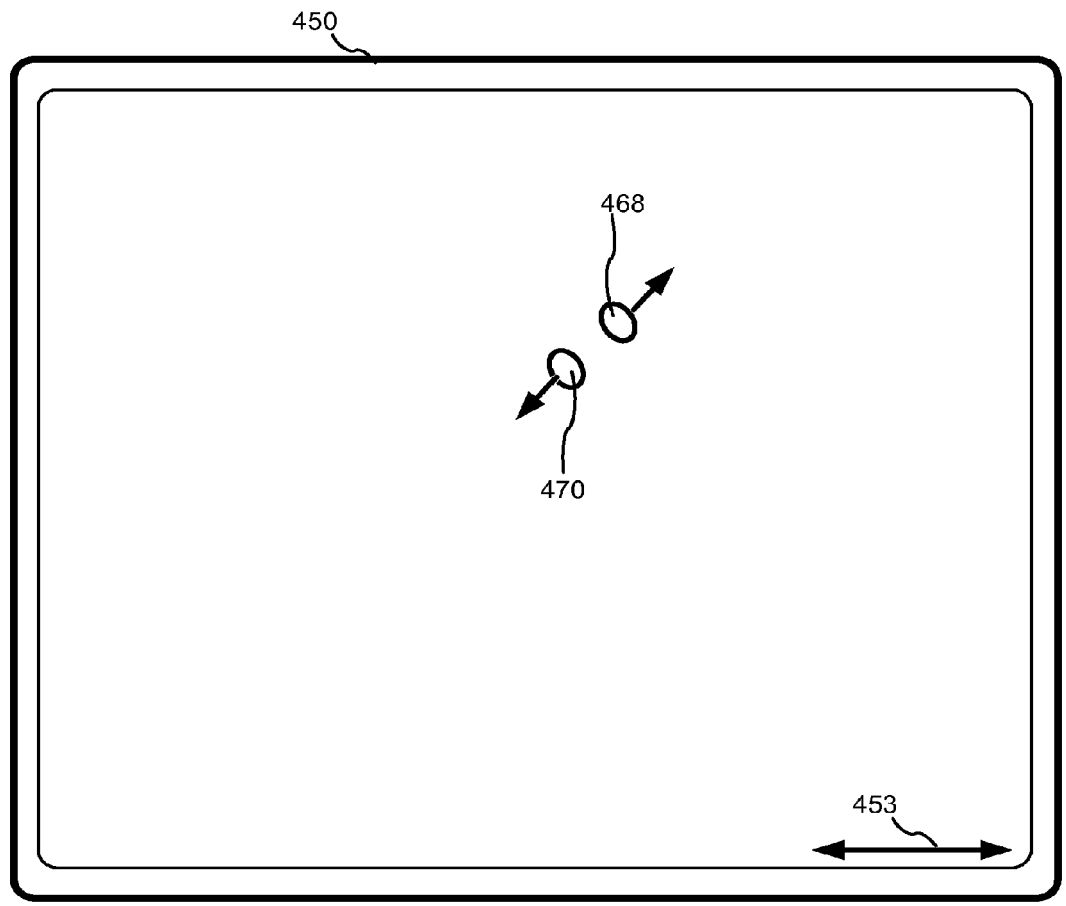
FIG. 4B illustrates an exemplary user interface for a multifunction device with a touch-sensitive surface that is separate from the display in accordance with some embodiments.
Figure 4B:
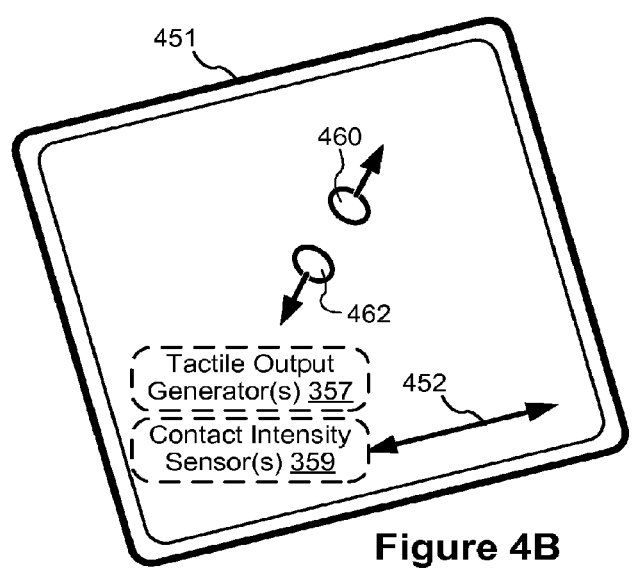

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Exemplary Devices

Attention is now directed towards embodiments of user interfaces ("UI") and associated processes that may be implemented on an electronic device with a display and optionally a touch-sensitive surface, such as device 300 or portable multifunction device 100.

FIGS. 5A-5Q illustrate exemplary user interfaces for displaying application status information in accordance with some embodiments. The user interfaces in these figures are used to illustrate the processes described below, including the processes in FIGS. 6A-6E.

FIG. 5A illustrates device 100, with device status bar 502 and application user interface 504 displayed on touch screen 112. Device status bar 502 displays status information about device 100, such as the current time, wireless signal strength, battery power remaining, etc. In some embodiments, device status bar 502 includes one or more of: signal strength indicator(s) 402, time 404, Bluetooth indicator 405, and battery status indicator 406.

Application user interface 504 is a user interface for an application (e.g., any of the modules or widgets described above with reference to FIGS. 1A, 3, and 4A) in device 100. In some embodiments, as explained in the examples below, the application is a web browser (e.g., browser module 147). In some embodiments, the application is an application other than a web browser (e.g., virtually any application with searchable content that displays a search input field or other application input field adjacent to the device status bar).

Application user interface 504 also includes control bar 512. Control bar 512 includes one or more buttons for activating various functions of the web browser application. For example, control bar 512 includes one or more of: a back control (to navigate to prior content within a content sequence (e.g., a browsing history)), a forward control (to navigate to subsequent content within a content sequence), a content sharing control, a bookmarks and history control, and a new window/tab control. Depending on the situation, one or more controls in control bar 512 may be disabled or control bar 512 may be hidden altogether.

Application user interface 504 includes content region 510, for displaying content (e.g., a web page), and application status bar 506. Application status bar 506 includes application input field 508. A user can make a request for content to be displayed in content region 510 by making an input into application input field 508. FIG. 5A shows contact 514 detected by device 100 at a location on touch screen 112 corresponding to application input field 508 to select application input field 508 and to begin the input.

Figure 5B:
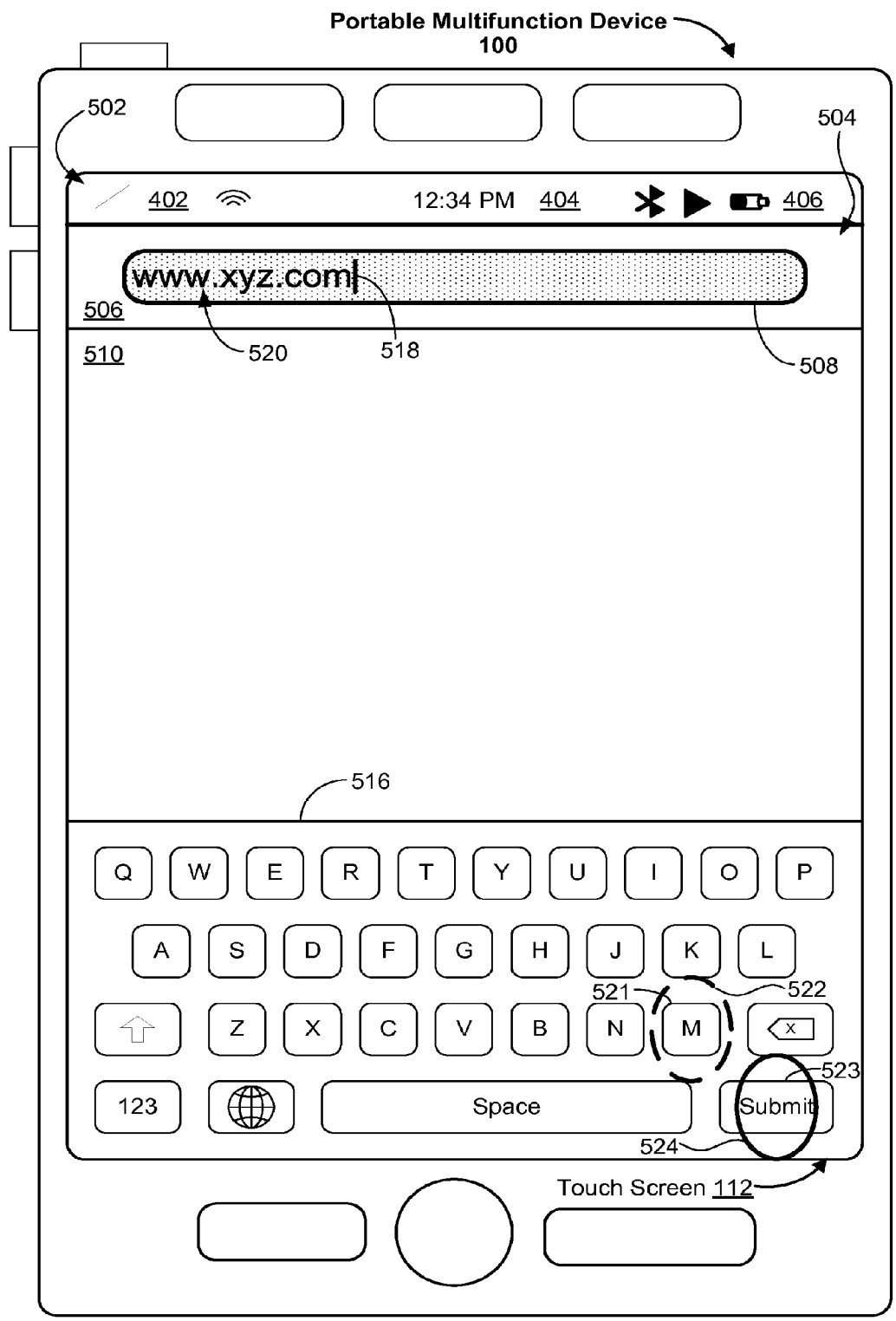

In response to detecting contact 514 at a location on touch screen 112 corresponding to application input field 508, device 100 selects application input field 508, and displays virtual keyboard 516 and cursor 518, as shown in FIG. 5B. Cursor 518 is displayed in application input field 508, indicating that application input field 508 is ready to accept text input from virtual keyboard 516, as well as indicating the current text input insertion position within application input field 508. The characters that are entered are displayed as text input 520 in application input field 508. A user enters text input 520, character by character, by activating one or more character keys (e.g., with gestures on the respective keys) on virtual keyboard 516. For example, FIG. 5B shows text input 520 "www.xyz.com," with the last character "m" entered by an activation of "M" key 521 with gesture 522 (e.g., a tap gesture) detected at a location on touch screen 112 corresponding to "M" key 521. Text input 520 is completed when submitted to device 100 (e.g., by activating "Submit" key 523 or the like).

Figure 5C:
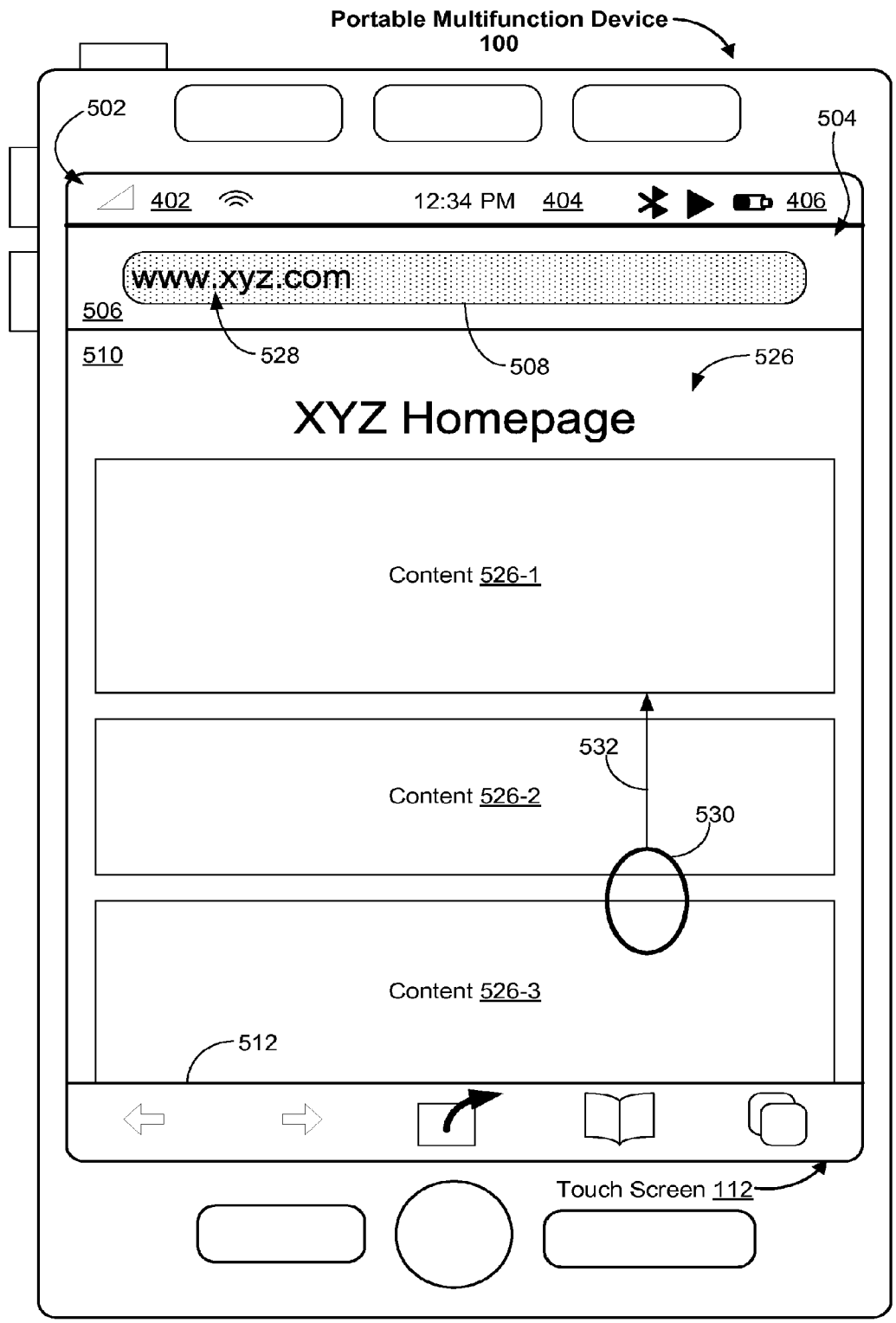

As shown in FIG. 5B, text input 520 "www.xyz.com" is a Universal Resource Locator (URL). When text input 520 is submitted to device 100, the application displays content in accordance with the submitted text input 520 in content region 510. For example, in response to detecting gesture 524 at a location on touch screen 112 corresponding to "Submit" key 523, text input 520 "www.xyz.com" is submitted to device 100. Device 100 downloads content 526 corresponding to the URL "www.xyz.com" and displays content 526 in content region 510, as shown in FIG. 5C. Concurrent with displaying content 526, device 100 displays text 528 in application input field 508. Text 528 corresponds to text input 520. For example, text 528 shows at least a portion of the full URL of content 526. If content 526 is secure content, an icon indicating such (e.g., a lock icon) is optionally displayed along with text 528 (e.g., adjacent to text 528) in application input field 508. Control bar 512 is also displayed in application user interface 504, along with content 526.

Content 526 is shown as having one or more content sub-blocks or items 526-1, 526-2, etc. It should be appreciated that content 526 and its sub-blocks or items (e.g., text, graphics, etc.) can be arranged in any suitable arrangement or structure. For ease of demonstrating content scrolling on device 100, content sub-blocks 526-1, 526-2, etc. are shown as arranged in a vertically oriented sequence.

In some embodiments, device status bar 502 and application input field 508 are displayed with different background colors, and texts displayed within the respective area have different sizes. For example, as shown in FIG. 5C, device status bar 502 and application input field 508 have different backgrounds colors, and text 528 in application input field 508 is displayed with a larger font size than current time 404 in device status bar 502. In some embodiments, application status bar 506 and application input field 508 are displayed with the same background color.

Figure 5D:
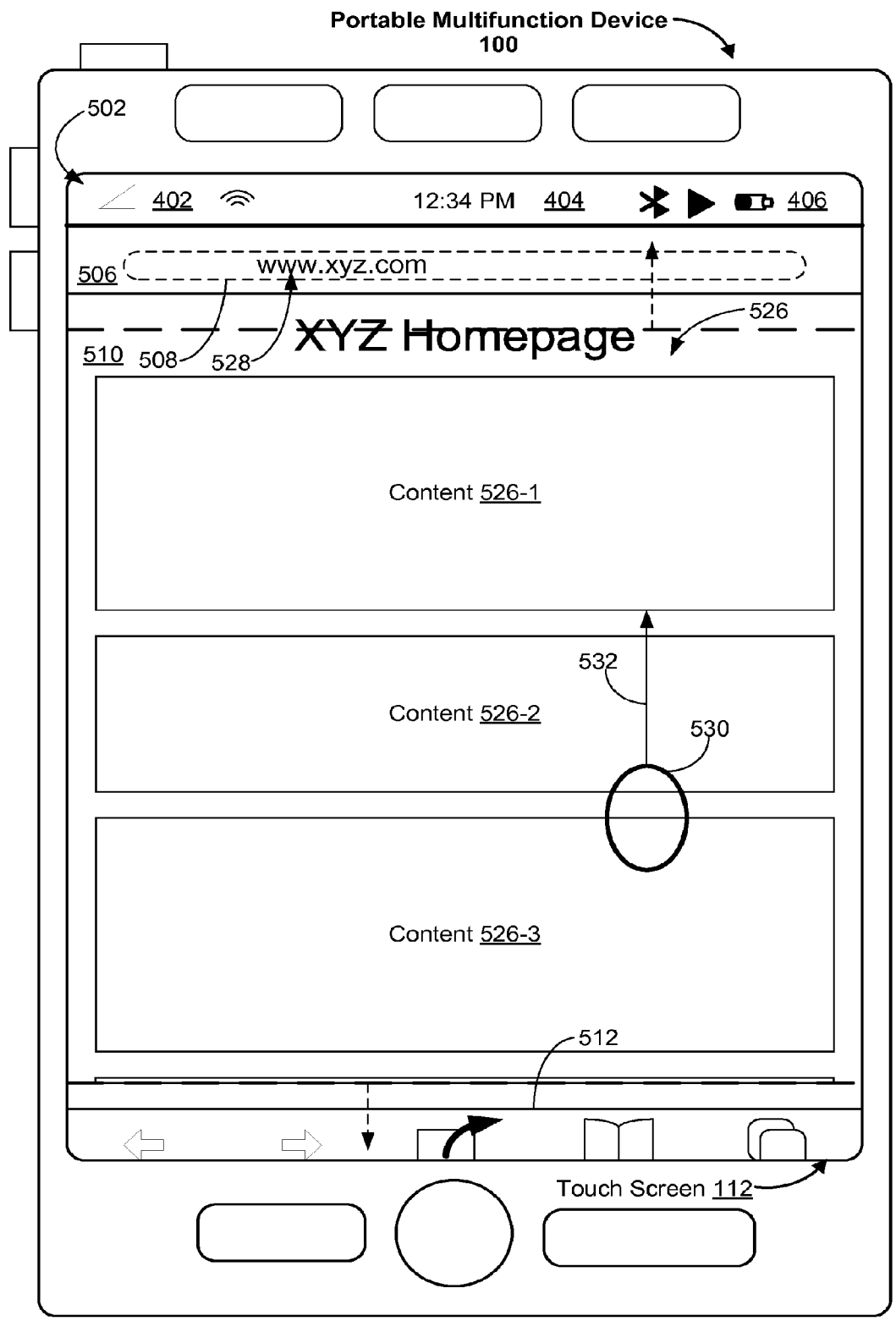
Figure 5E:
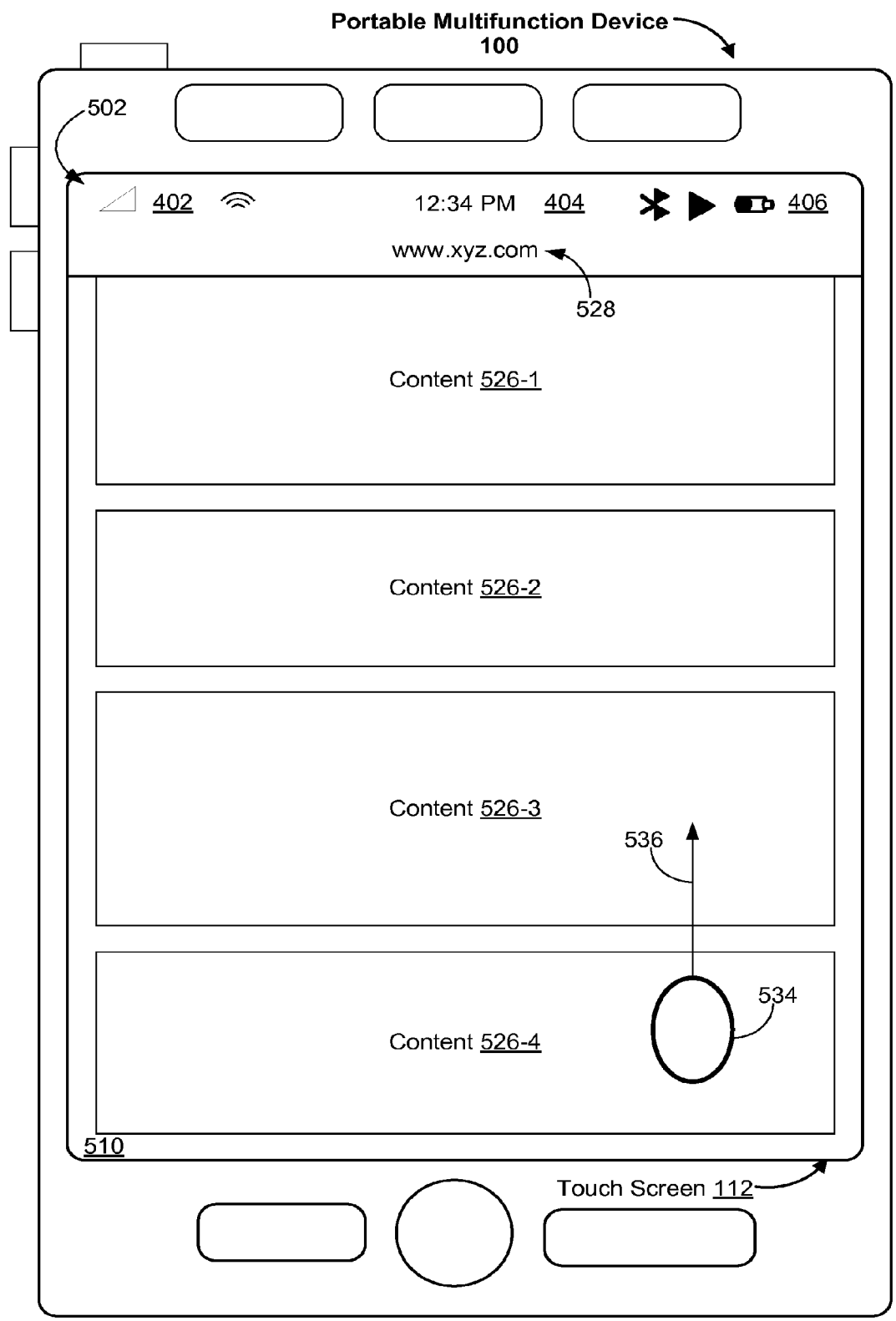

While content 526 is displayed, the user can scroll content 526. For example, while content 526 is displayed in content region 510 and text 528 is displayed in application input field 508, the user performs a gesture on touch screen 112 that includes movement of contact 530 in direction 532, which is an upward direction. In response to detecting the gesture with contact 530, device 100 scrolls content 526 in direction 532 (e.g., upward), as shown in FIGS. 5D-5E. As shown in FIGS. 5D-5E, content 526-1, 526-2, etc. scroll in direction 532 in response to detection of the gesture with contact 530.

Also in response to detecting the gesture with contact 530, device 100 displays an animation of application status bar 506 and application input field 508. In some embodiments, the animation shows application status bar 506 decreasing in size, and application input field 508 fading away, as shown in FIG. 5D. In some embodiments, the animation also includes the background color of application input field 508 (and also the background color of application status bar 506) changing to match the background color of device status bar 502, and text 528 shifting upward toward device status bar 502 and changing font size to match the font size of text in device status bar 502, as shown in FIGS. 5D-5E. In FIG. 5D text 528 is offset to the left along a horizontal axis of touch screen 112, and in FIG. 5E in addition to the other transformations, text 528 is moved toward a center of touch screen 112 along the horizontal axis of touch screen 112. In some embodiments the animation shown in FIGS. 5C-5E advances with direct manipulation (e.g., the rate of progression through the animation is determined based on a rate of movement of the contact in a respective direction, if the contact moves slower in the respective direction, the animation progresses slower and if the contact moves faster in the respective direction, the animation progresses more quickly).

When the animation is complete, application input field 508 is no longer displayed, and text 528 is displayed adjacent to device status bar 502, as shown in FIG. 5E. If content 526 is secure content, an icon indicating such (e.g., a lock icon) is optionally displayed along with text 528 (e.g., adjacent to text 528). In some embodiments, text 528 is visually merged with device status bar 502; text 528 is displayed in an area that is not visually distinguished from device status bar 502 (as shown in FIG. 5E for example). In some embodiments, text 528 that is visually merged with device status bar 502 is displayed with text properties that are the same as that of text in device status bar 502 (e.g., same font size as text in device status bar 502). In some other embodiments, application status bar 506 is displayed, adjacent to and below device status bar 502, with a smaller size (e.g., half the height compared to the height prior to the animation) but still visually distinct from device status bar 502 (e.g., a border is displayed between device status bar 502 and application status bar 506), and text 528 is displayed in the smaller applications status bar 506.

In some embodiments, in response to detecting the gesture performed with contact 530, device 100 displays an animation of control bar 512. The animation shows control bar 512 decreasing in size, as shown in FIG. 5D. When the animation is complete, control bar 512 is no longer displayed, as shown in FIG. 5E.

Figure 5F:
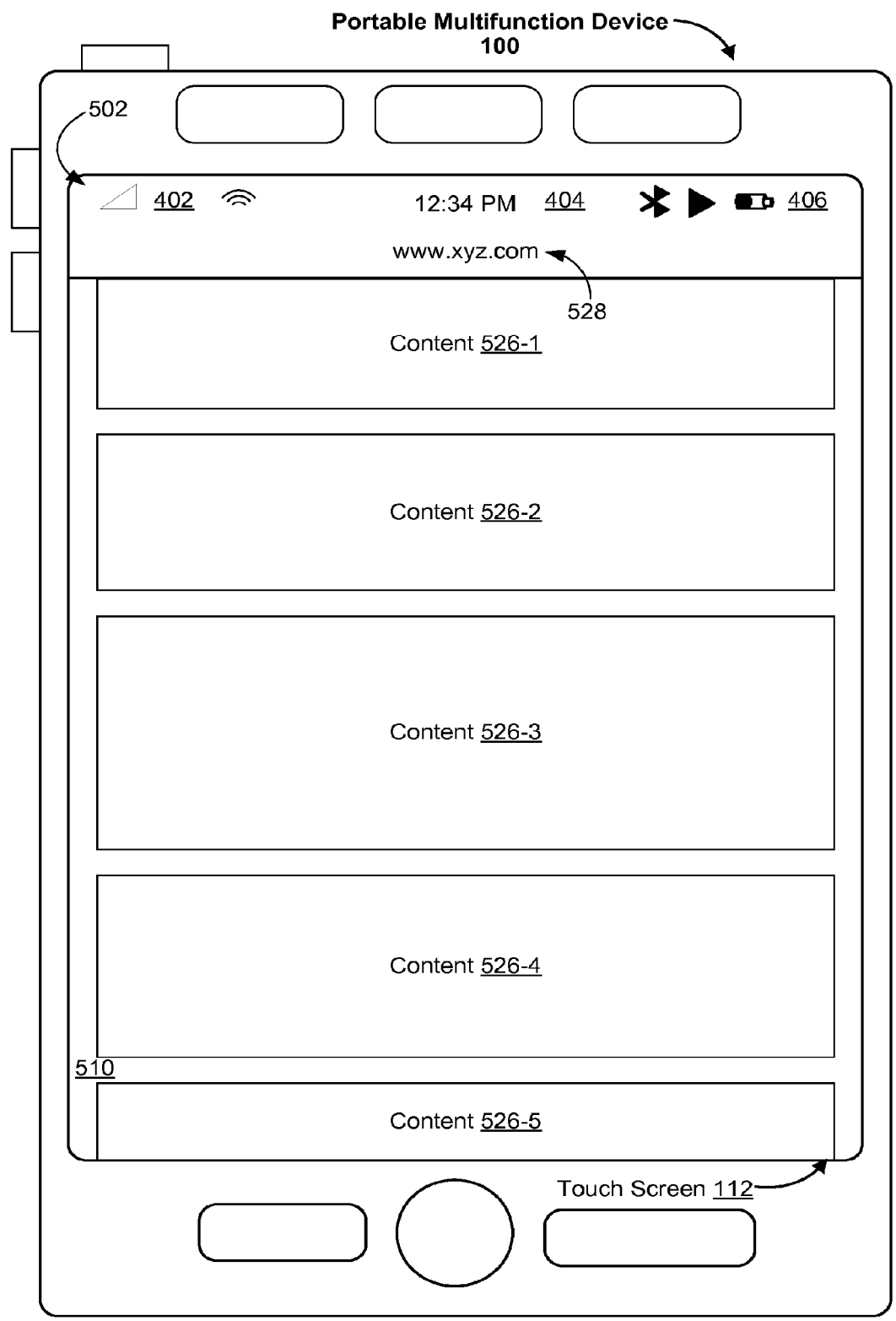

FIG. 5E shows a gesture, following on the gesture performed with contact 530, performed by the user on touch screen 112 that includes movement of contact 534 in direction 536, which is the same direction as direction 532. In response to detecting the gesture performed with contact 534, device 100 scrolls content 526 in direction 536, as shown in FIG. 5F. As shown in FIG. 5F, content 526-1, 526-2, etc. scroll in direction 536 in response to detection of the gesture performed with contact 534. Meanwhile, text 528 remains displayed adjacent to device status bar 502 in a visually merged manner.

Figure 5G:
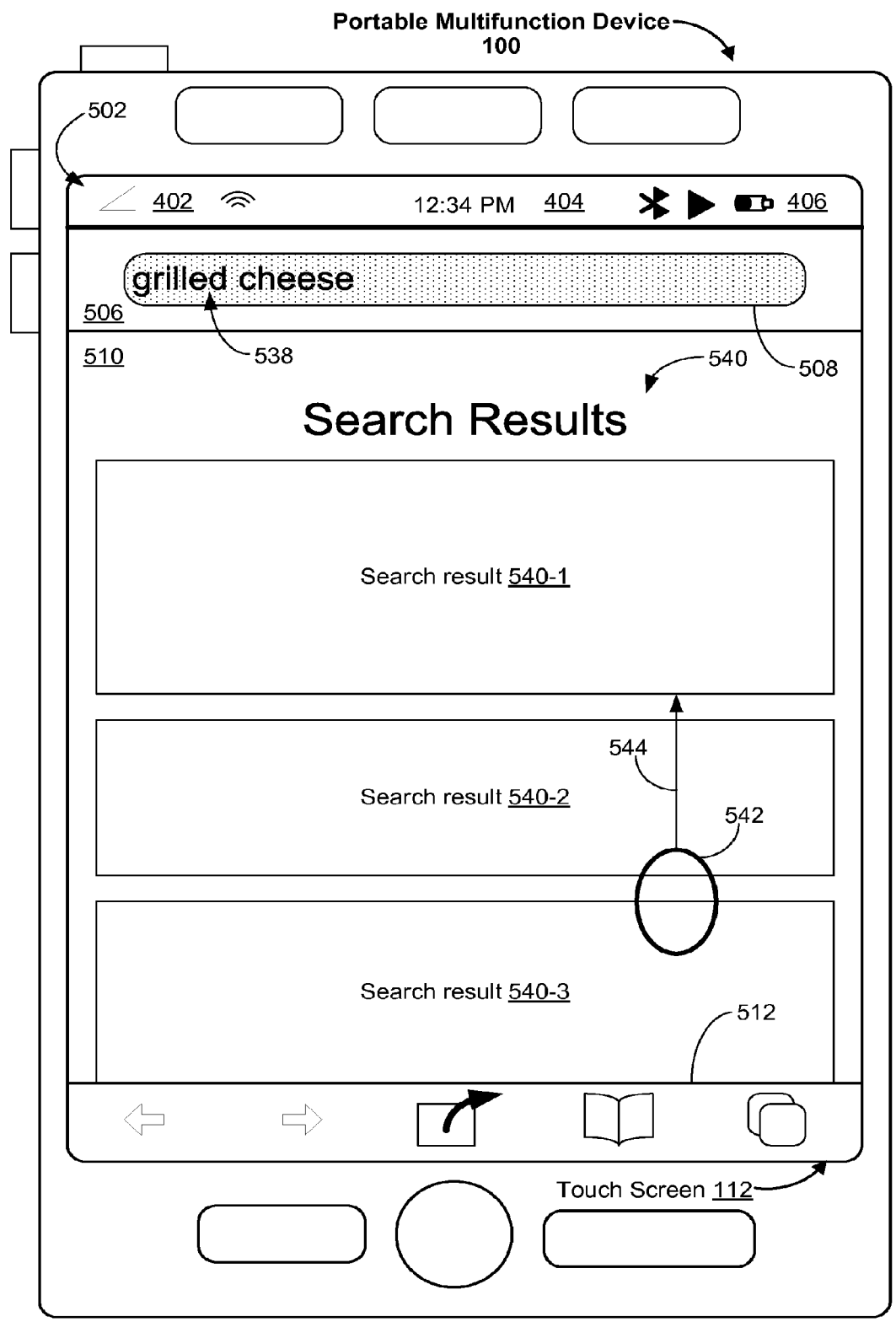

FIGS. 5B-5F show text input 520 and text 528 that correspond to a URL. It should be appreciated that other text can be input into application input field 508. For example, if text input 520 was, instead of a URL, one or more search terms, such as "grilled cheese," device 100 performs an online search for the term "grilled cheese" and displays in content region 510 content 540 that includes the search results for the term "grilled cheese," as shown in FIG. 5G. Text 538 corresponding to the search term(s) in text input 520 is displayed in application input field 508. In some embodiments, control bar 512 is concurrently displayed along with content 540 in content region 510 and text 538 in application input field 508.

Figure 5H:
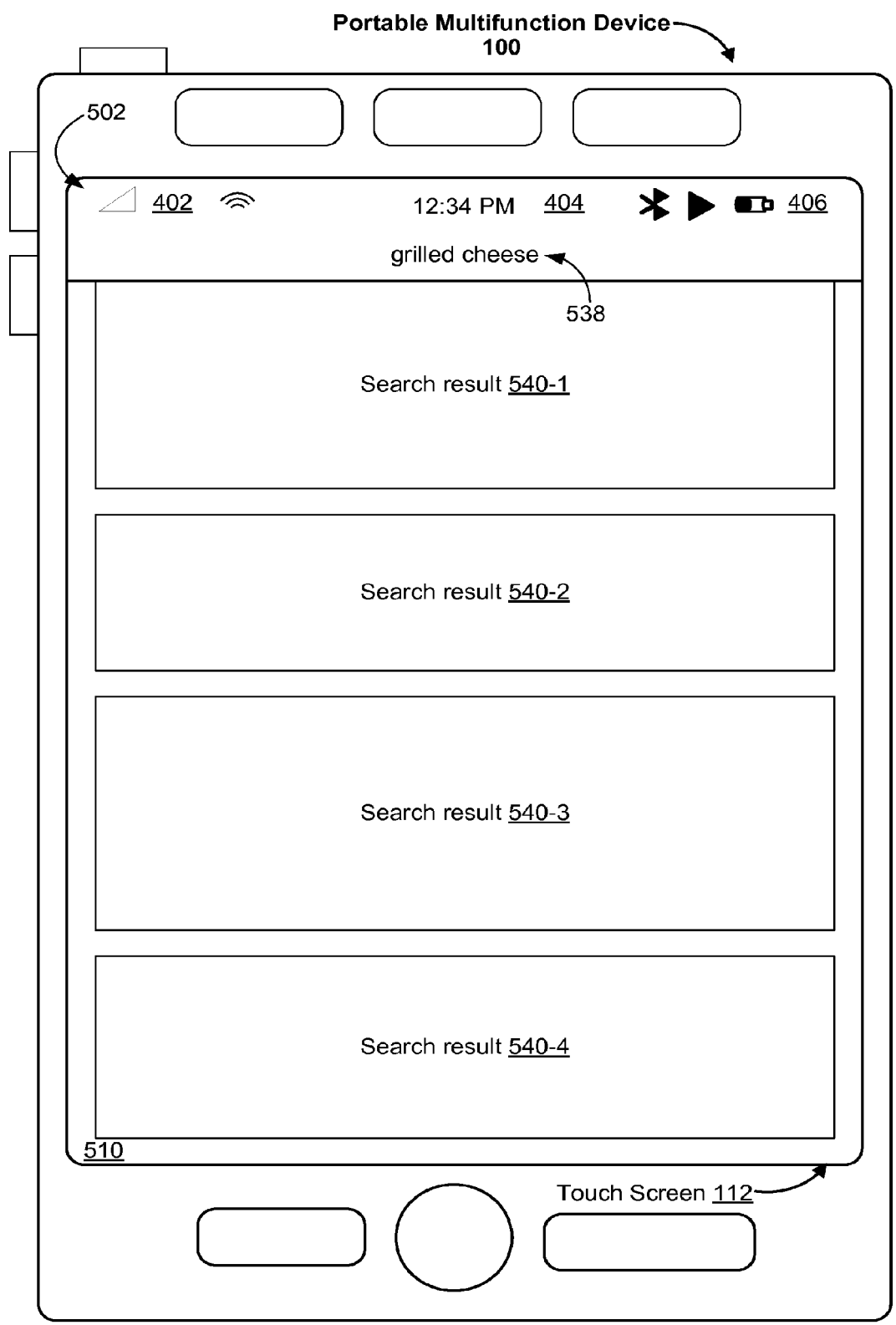

While content 540 is displayed in content region 510 and text 538 is displayed in application input field 508, the user performs a gesture on touch screen 112 that includes movement of contact 542 in direction 544, which is an upward direction. In response to detecting the gesture performed with contact 542, device 100 scrolls content 540 in direction 544, as shown in FIG. 5H. As shown in FIG. 5H, content 540-1, 540-2, etc. scroll in direction 544 in response to detection of the gesture performed with contact 542. Also in response to detecting the gesture performed with contact 542, device 100 displays an animation of application status bar 506, application input field 508, and text 538 similar to the animation described above with reference to FIGS. 5C-5E. When the animation is complete, application input field 508 is no longer displayed, and text 538 (e.g., the search query "grilled cheese") is displayed adjacent to device status bar 502, as shown in FIG. 5H. In some embodiments, in response to detecting the gesture performed with contact 542, device 100 displays an animation of control bar 512 similar to the animation of control bar 512 described above with reference to FIGS. 5C-5E. When the animation is complete, control bar 512 is no longer displayed, as shown in FIG. 5H.

Figure 5I:
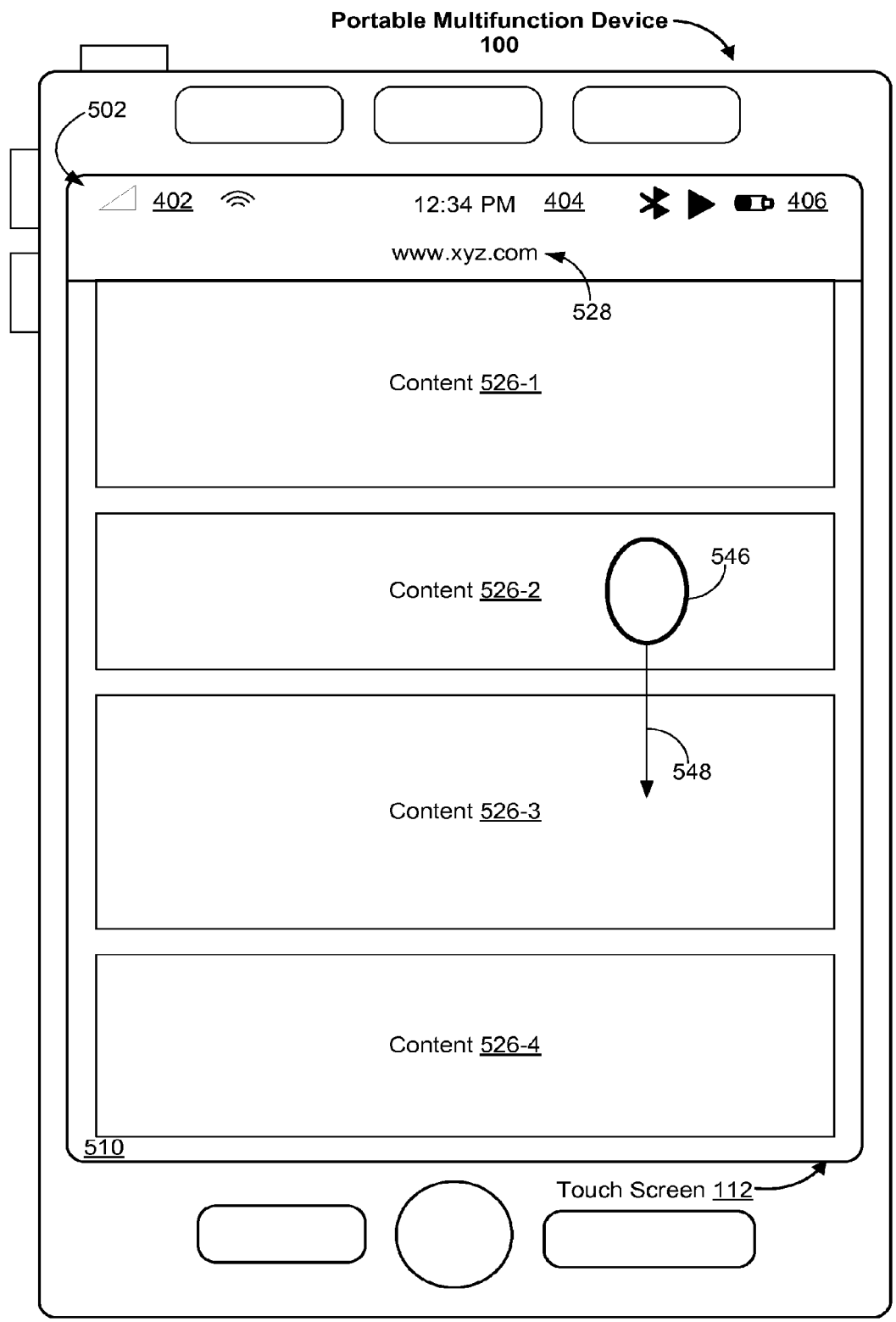
Figure 5J:
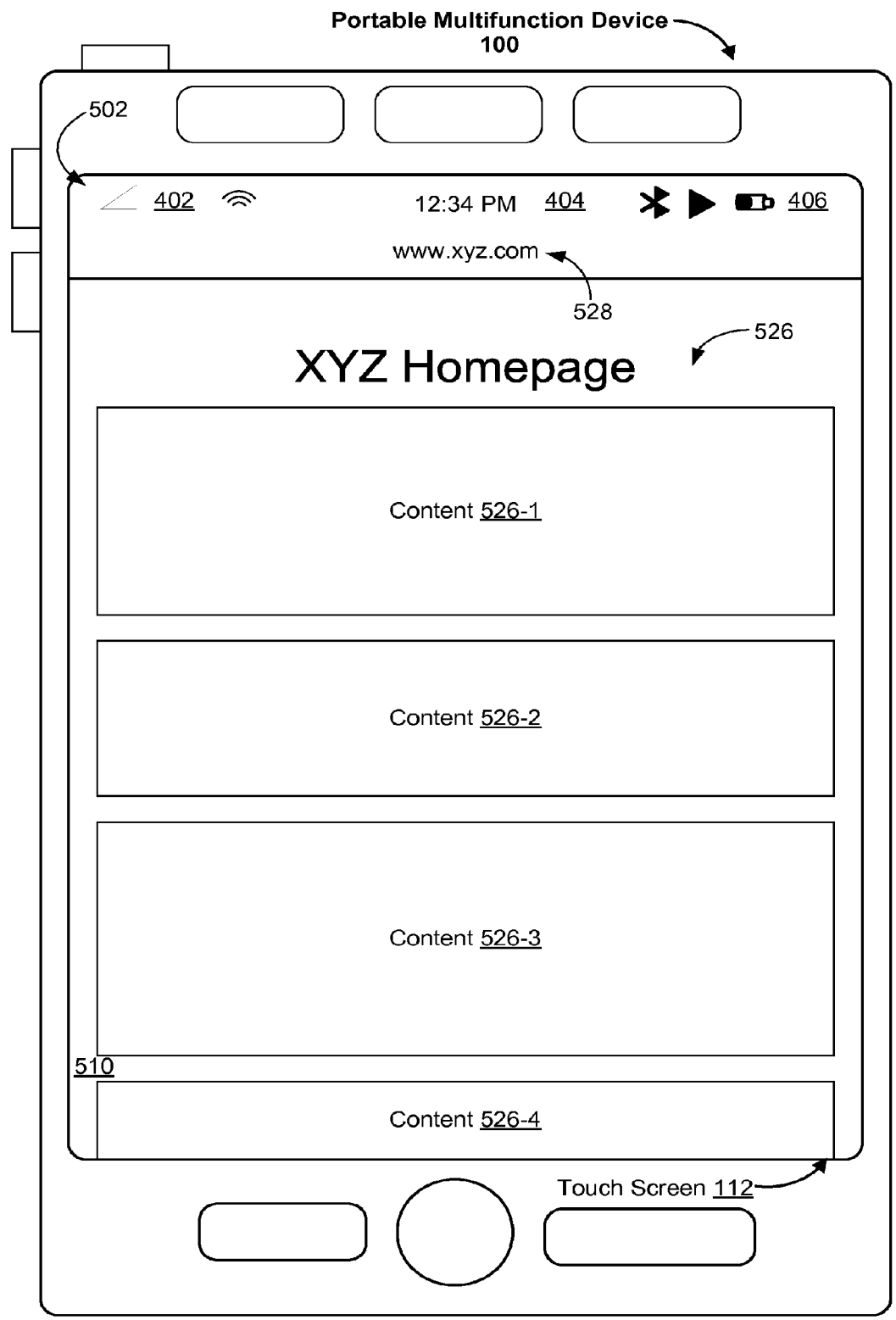

Returning to the URL example shown in FIGS. 5B-5F, FIG. 5I shows, while content 526 is displayed in content region 510 and text 528 is displayed adjacent to device status bar 502, a gesture performed on touch screen 112 is detected by device 100. The gesture includes movement of contact 546 in direction 548, which is opposite of directions 532 and 536. In response to detecting the gesture performed with contact 546, device 100 scrolls content 526 in direction 548, as shown in FIGS. 5J-5L.

In some embodiments, the gesture is a swipe or a tug gesture. In a swipe gesture, the contact moves on touch screen 112 substantially from rest for some distance, with acceleration, and lifts off from touch screen 112 while accelerating. For example, if the gesture performed with contact 546 is a swipe gesture, contact 546 moves in direction 548 with increasing speed for some distance and then lifts off while the speed is still increasing (or still above a predetermined speed threshold). In a tug gesture, the contact moves on touch screen 112 substantially from rest for some distance, with acceleration, and then decelerates (e.g., to substantially a stop) before liftoff. For example, the gesture performed with contact 546 is a tug gesture, contact 546 moves in direction 548 with increasing speed for some distance, and then stops suddenly.

In some embodiments, depending on whether the gesture performed with contact 546 meets one or more input field redisplay criteria, application input field 508 is redisplayed in response to the detection of the gesture performed with contact 546. If the gesture does not meet the one or more criteria, then content 526 is scrolled and text 528 remains displayed adjacent to device status bar 502, and application input field 508 remains not displayed, as shown in FIG. 5I. If the gesture does meet the one or more criteria, an animation showing application input field 508 and application status bar 506 being re-displayed is displayed on touch screen 112. When the animation is complete, application status bar 506 and application input field 508 are re-displayed, and text 528 is displayed in application input field 508.

Figure 5K:
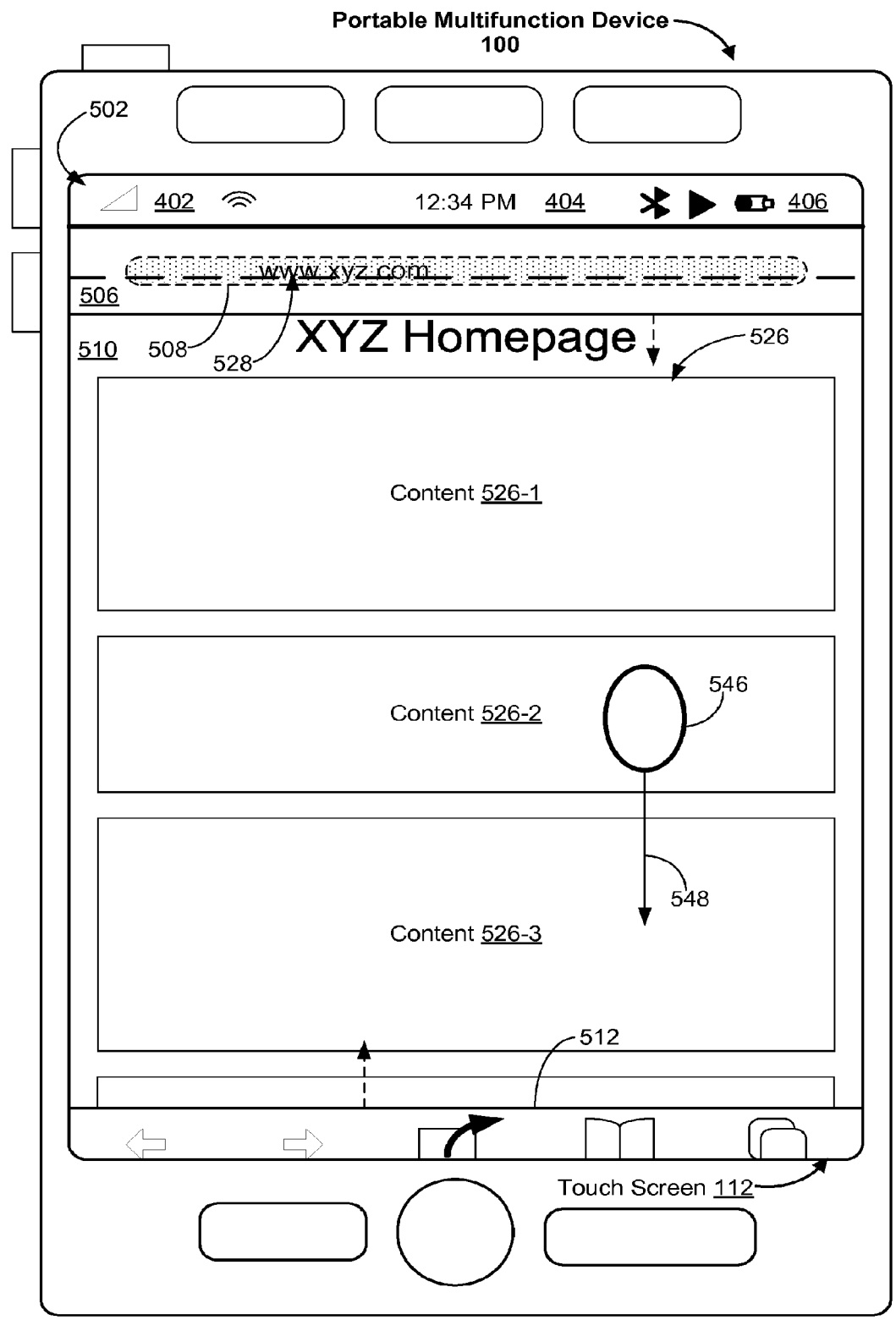
Figure 5L:
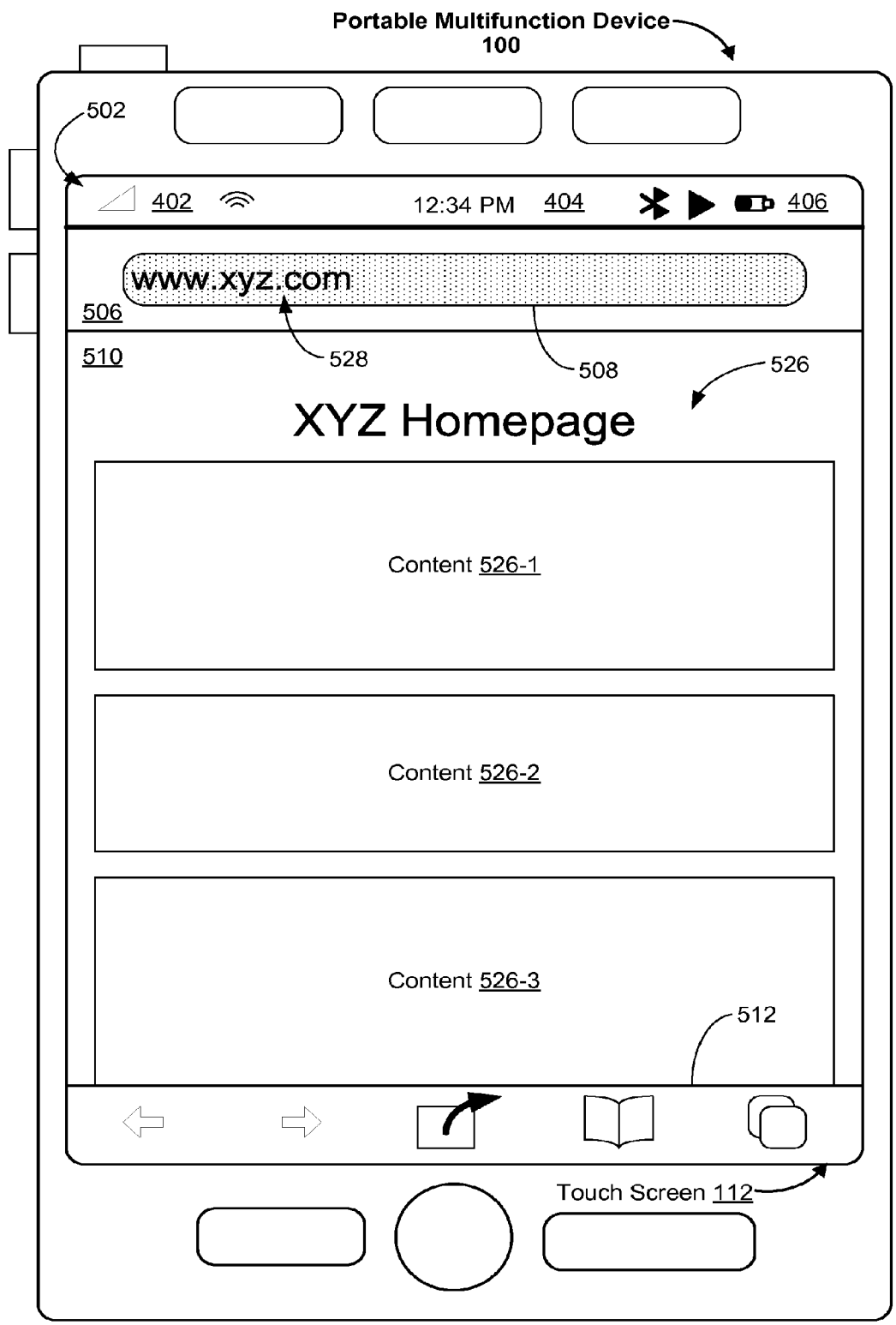

In some embodiments, the re-display animation is a reverse of the animation described above with reference to FIGS. 5C-5E; the animation includes text 528 increasing in size to its original font size and shifting downward away from device status bar 502, and the background color behind text 528 changing to the original background color of application input field 508 as application input field 508 re-appears, as shown in FIGS. 5K-5L. In some embodiments, in response to detecting the gesture performed with contact 546, device 100 re-displays control bar 512. For example, device 100 displays an animation that shows control bar 512 re-appearing, as shown in FIGS. 5K-5L. In some embodiments the animation shown in FIGS. 5K-5L advances with direct manipulation (e.g., the rate of progression through the animation is determined based on a rate of movement of the contact in a respective direction, if the contact moves slower in the respective direction, the animation progresses slower and if the contact moves faster in the respective direction, the animation progresses more quickly).

In some embodiments, when the gesture is a swipe gesture, the input field redisplay criteria include a criterion that is met when the contact in the gesture has a speed above a predetermined threshold at a predetermined point in the swipe gesture. For example, if the gesture performed with contact 546 is a swipe gesture, the criteria is met if contact 546 moves at a speed above a threshold at a predetermined point in the movement (e.g., a predetermined number of pixels from the starting point of contact 546, a predetermined number of pixels from the liftoff point of contact 546).

In some embodiments, when the gesture is a tug gesture, the input field redisplay criteria include a criterion that is met when the magnitude of the speed increase in the contact movement that occurs in a time window before the speed decrease in the contact movement is above a predetermined threshold. For example, if the gesture performed with contact 546 is a tug gesture, the criteria is met if the amount of the speed increased in the movement of contact 546 that occurred a predetermined amount of time before detecting the speed decrease is above a threshold, as described in greater detail below with reference to method 600.

Figure 5M:
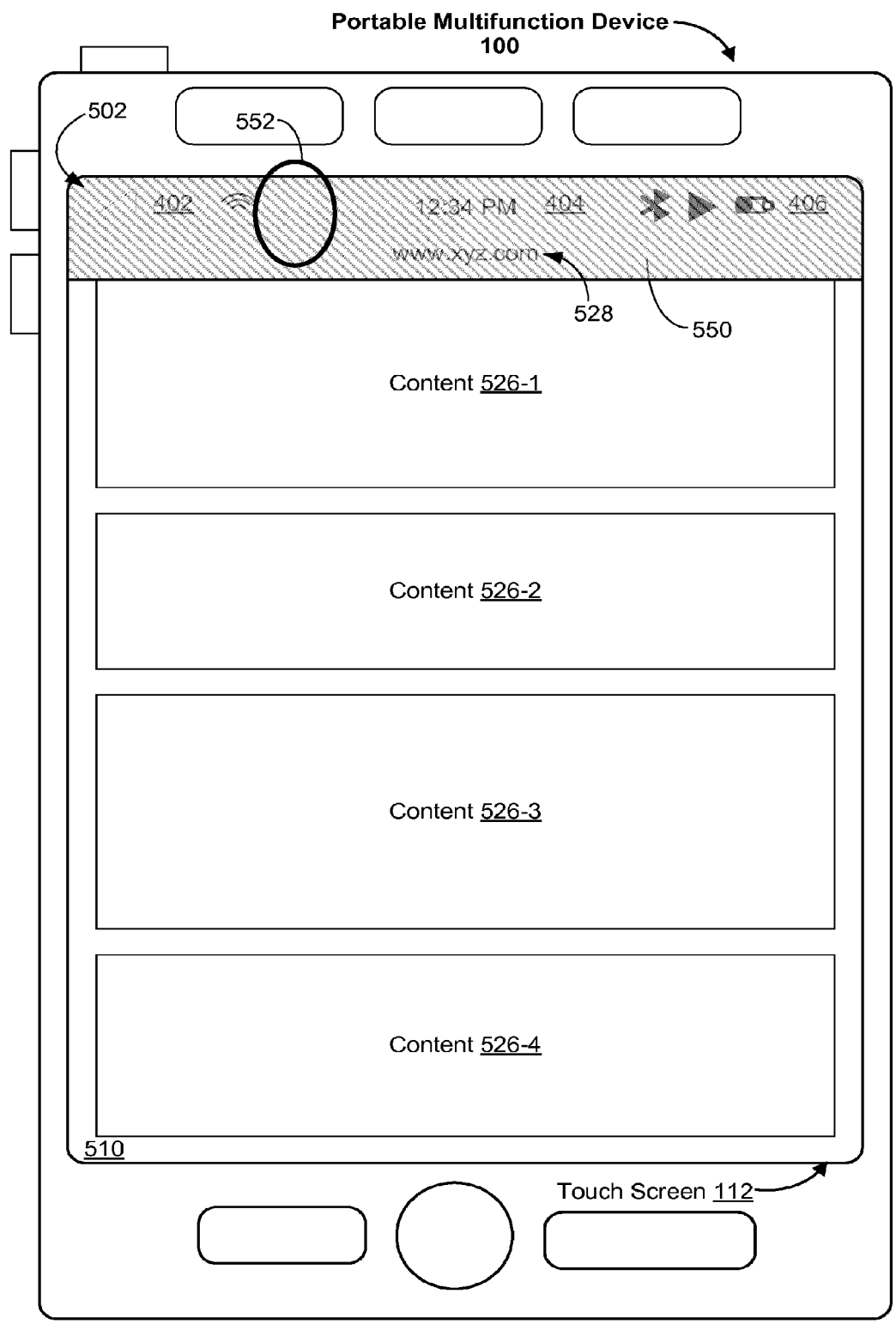

FIG. 5M illustrates content 526 displayed in content region 510, application input field 508 not displayed, and text 528 displayed adjacent to device status bar 502. FIG. 5M also illustrates hidden activation region 550 that includes both device status bar 502 and text 528. Hidden activation region 550 is not displayed on touch screen 112, but is shown in the figures as a pattern of diagonal lines for ease of understanding. Activation region 550 is larger than device status bar 502. With activation region 550 encompassing both device status bar 502 and text 528, a gesture (e.g., a tap gesture) detected on touch screen 112 in activation region 550 is detected as a contact at a location corresponding to text 528 and as a contact at a location corresponding to device status bar 502.

Figure 5N:
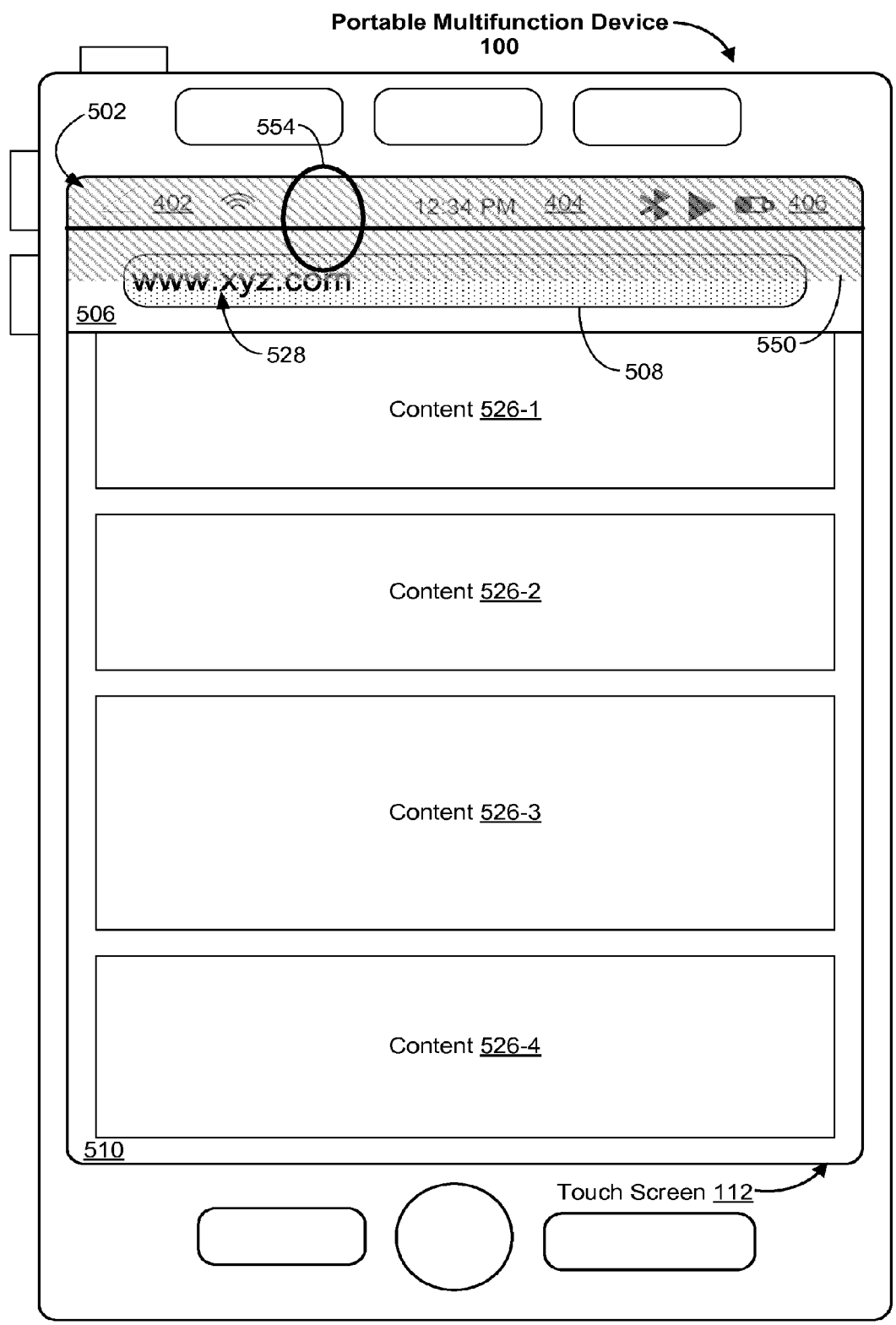

FIG. 5M also shows device 100 detecting gesture 552 (e.g., a tap gesture) on touch screen 112 in activation region 550, while text 528 is displayed adjacent to device status bar 502 and application input field 508 not displayed. In response to detecting gesture 552, device 100 re-displays application status bar 506 and application input field 508 within application status bar 506, and text 528 is moved to within application input field 508, as shown in FIG. 5N. For example, the transition to redisplaying application input field 508 includes displaying the animation described above with reference to FIGS. 5K-5L. In some embodiments, activation region 550 is enlarged to encompass there-displayed application status bar 506 and application input field 508. In some embodiments, activation region 550 remains the same size even when application status bar 506 is redisplayed, and the application input field is associated with a different activation region, so as to enable the user to select the device status bar by performing a tap gesture in activation region 550 for the device status bar or select the application input field by performing a tap gesture in a different activation region for the application input field.

In some embodiments, device 100 re-displays application status bar 506 and application input field 508 in response to detecting gesture 552 without scrolling content 526, as shown in FIG. 5N. In some other embodiments, device 100 re-displays application status bar 506 and application input field 508, and scrolls content 526 to the top, in response to detecting gesture 552.

Figure 5O:
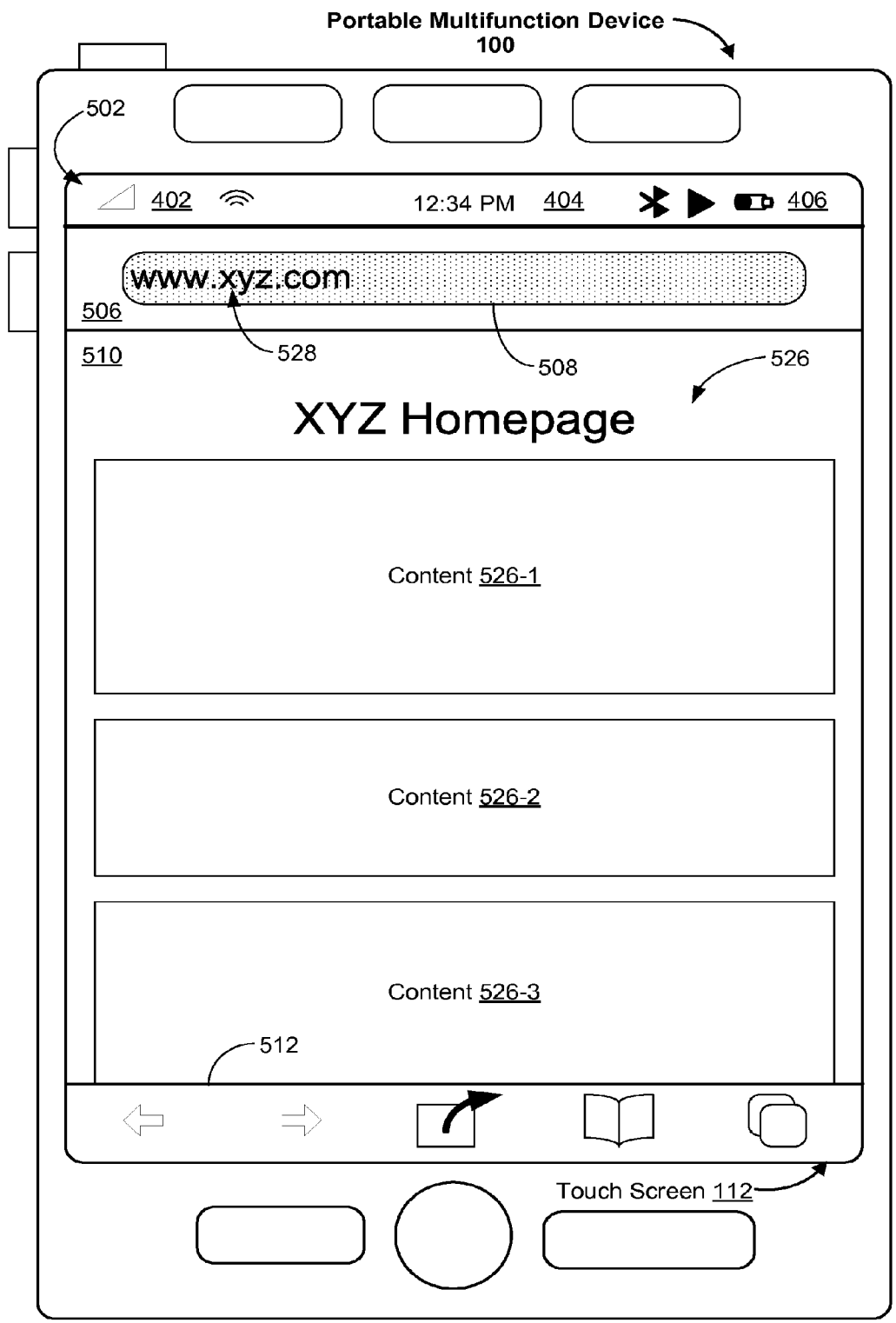

FIG. 5N also shows, after application input field 508 is re-displayed, device 100 detecting gesture 554 (e.g., a tap gesture) on touch screen 112 in activation region 550, which now encompasses application input field 508. In response to detecting gesture 554, device 100 scrolls content 526 to the top, as shown in FIG. 5O. In contrast, in some embodiments, a tap gesture in an activation region for application input field 508 would enable the user to edit the text in application input field 508 (e.g., the device would display a virtual keyboard for editing the text in the application input field) without scrolling content to the top.

Figure 5P:
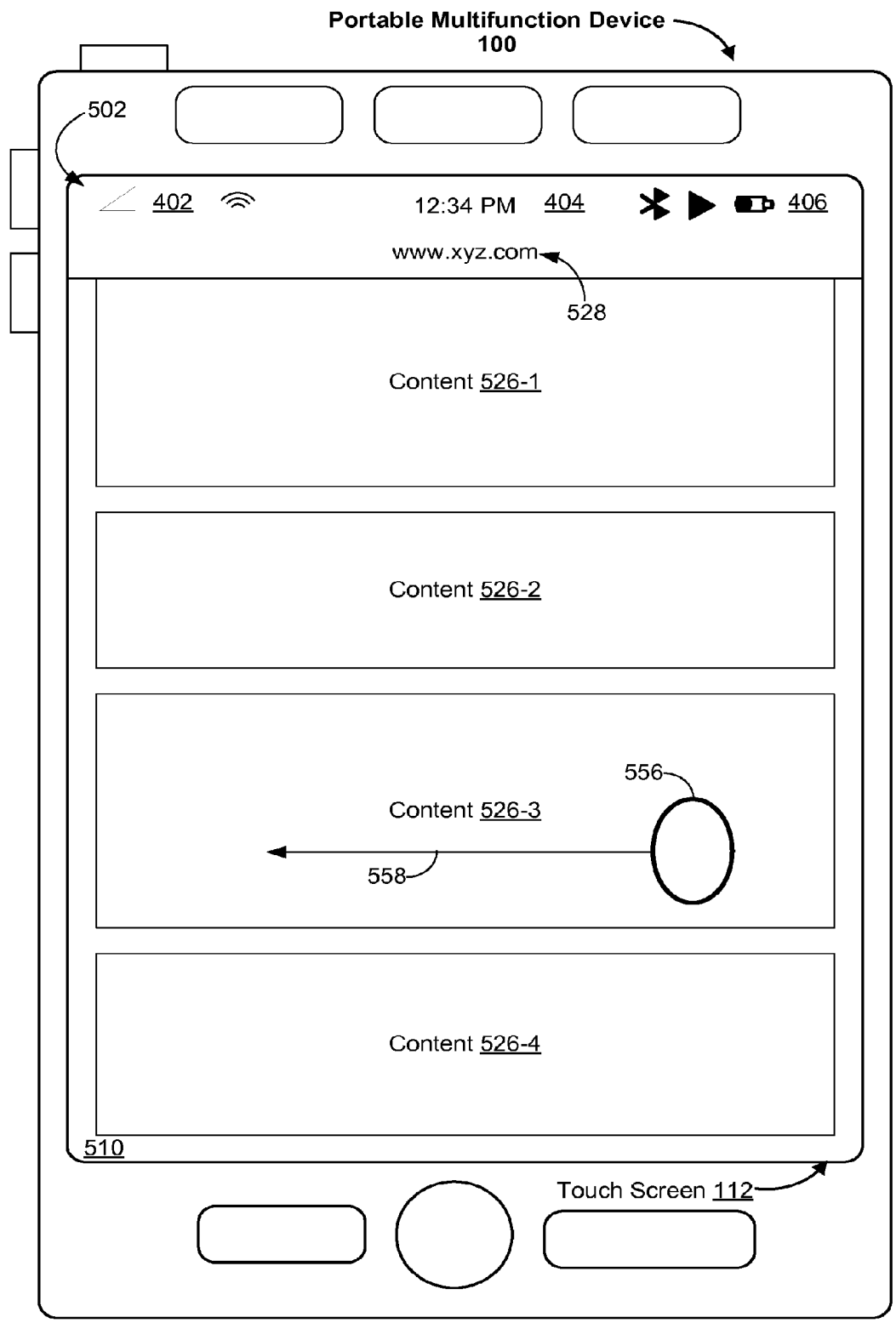
Figure 5Q:
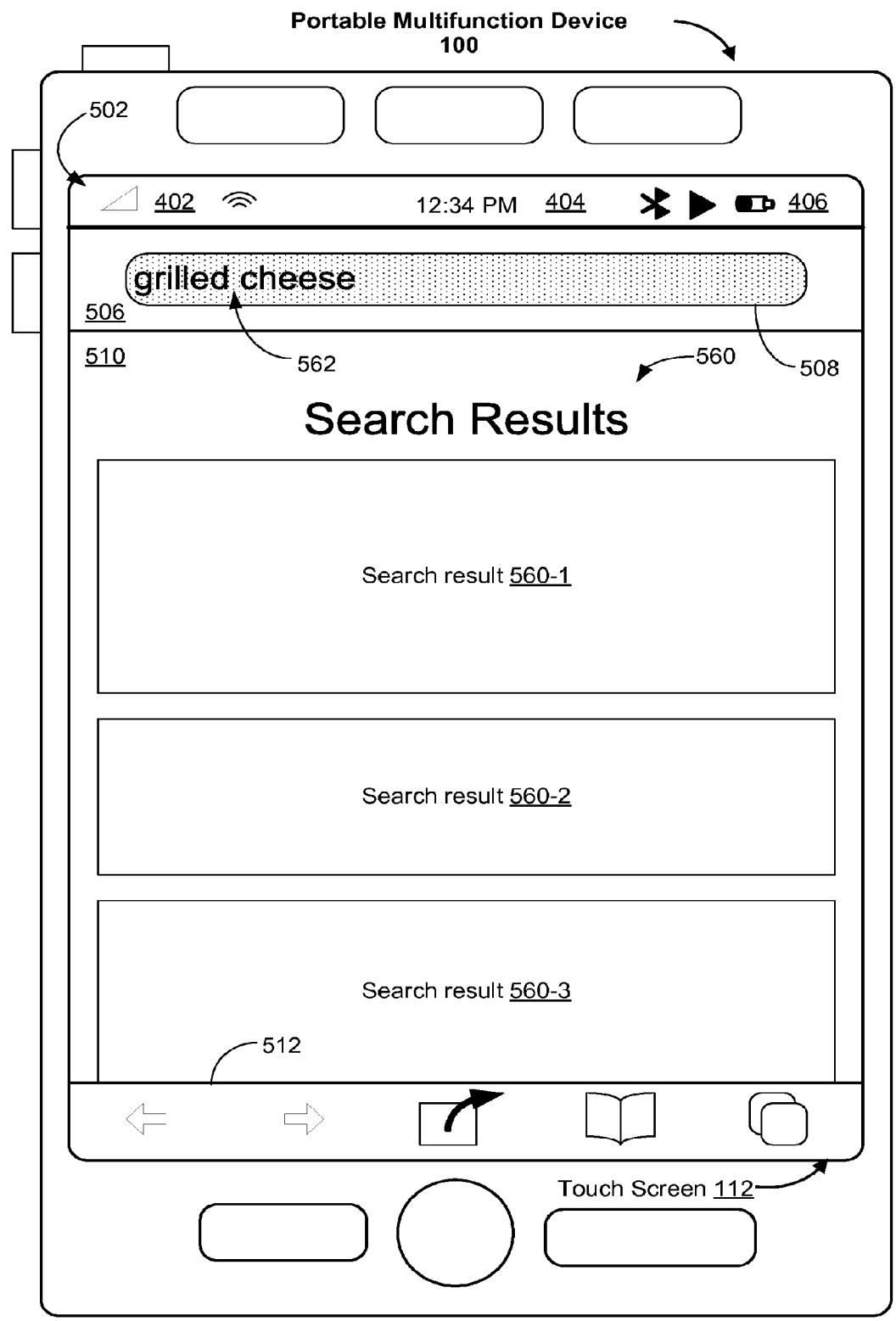
Figure 6A:
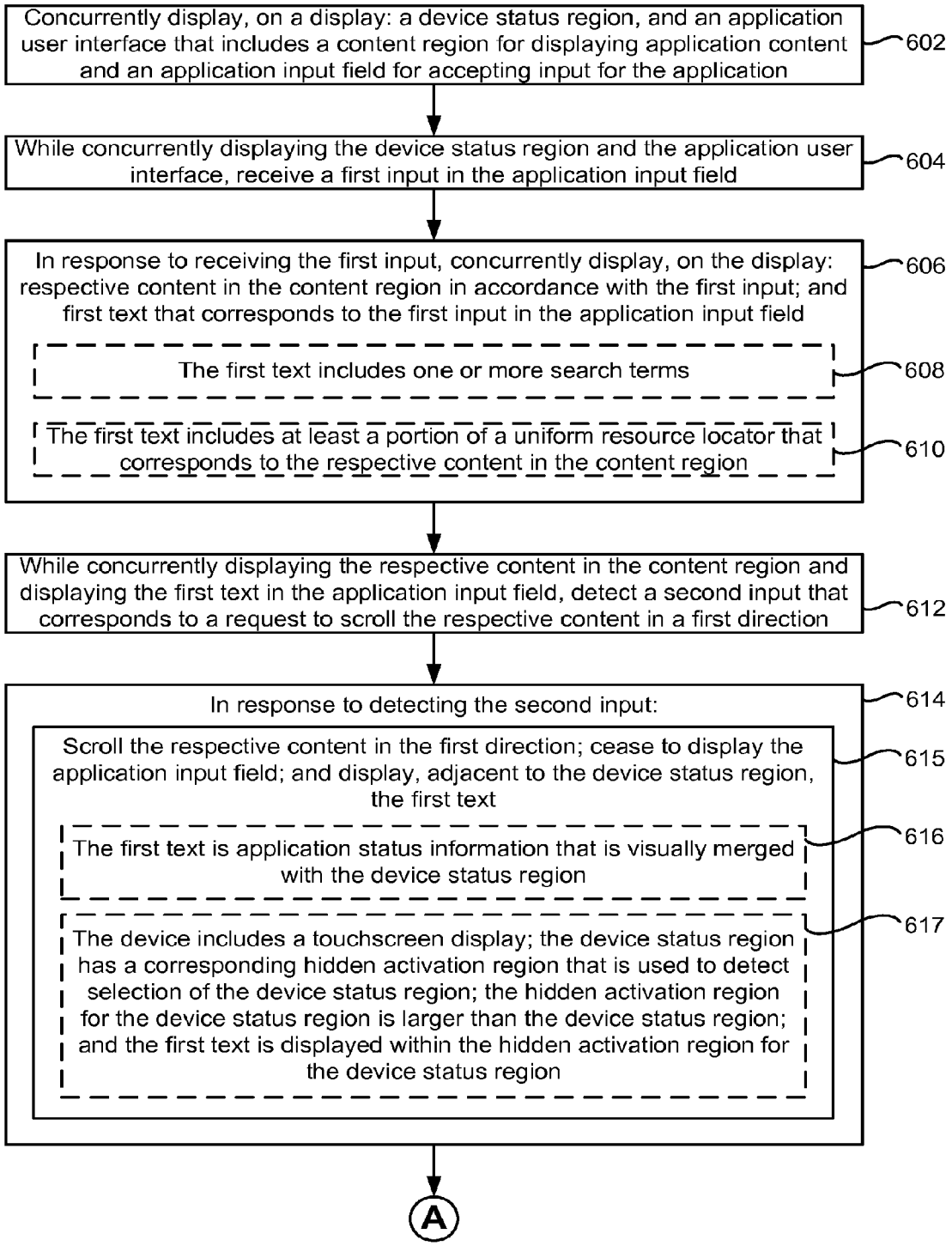
FIGS. 6A-6E are flow diagrams illustrating a method of displaying application status information in accordance with some embodiments.
Figure 6B:
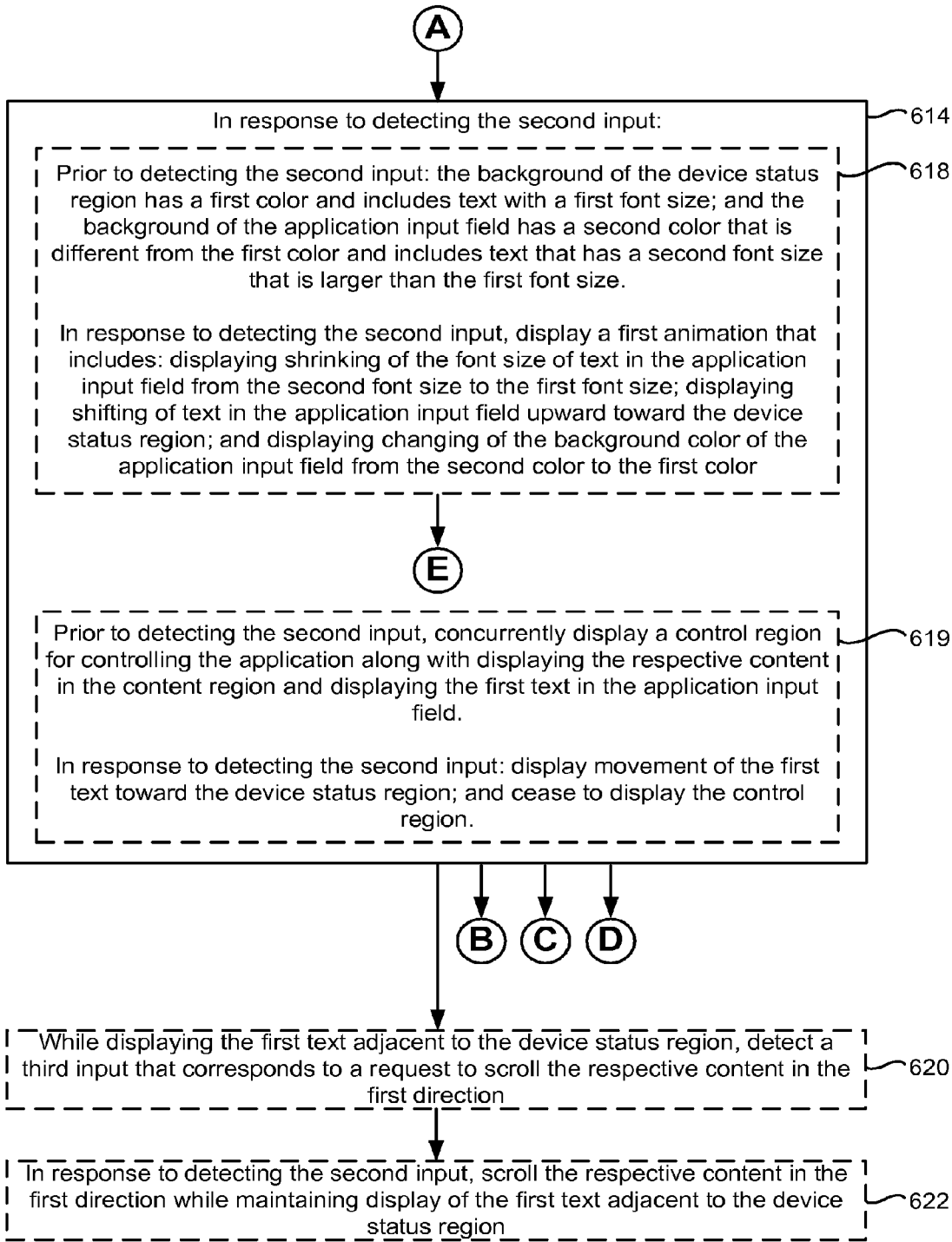
Figure 6C:
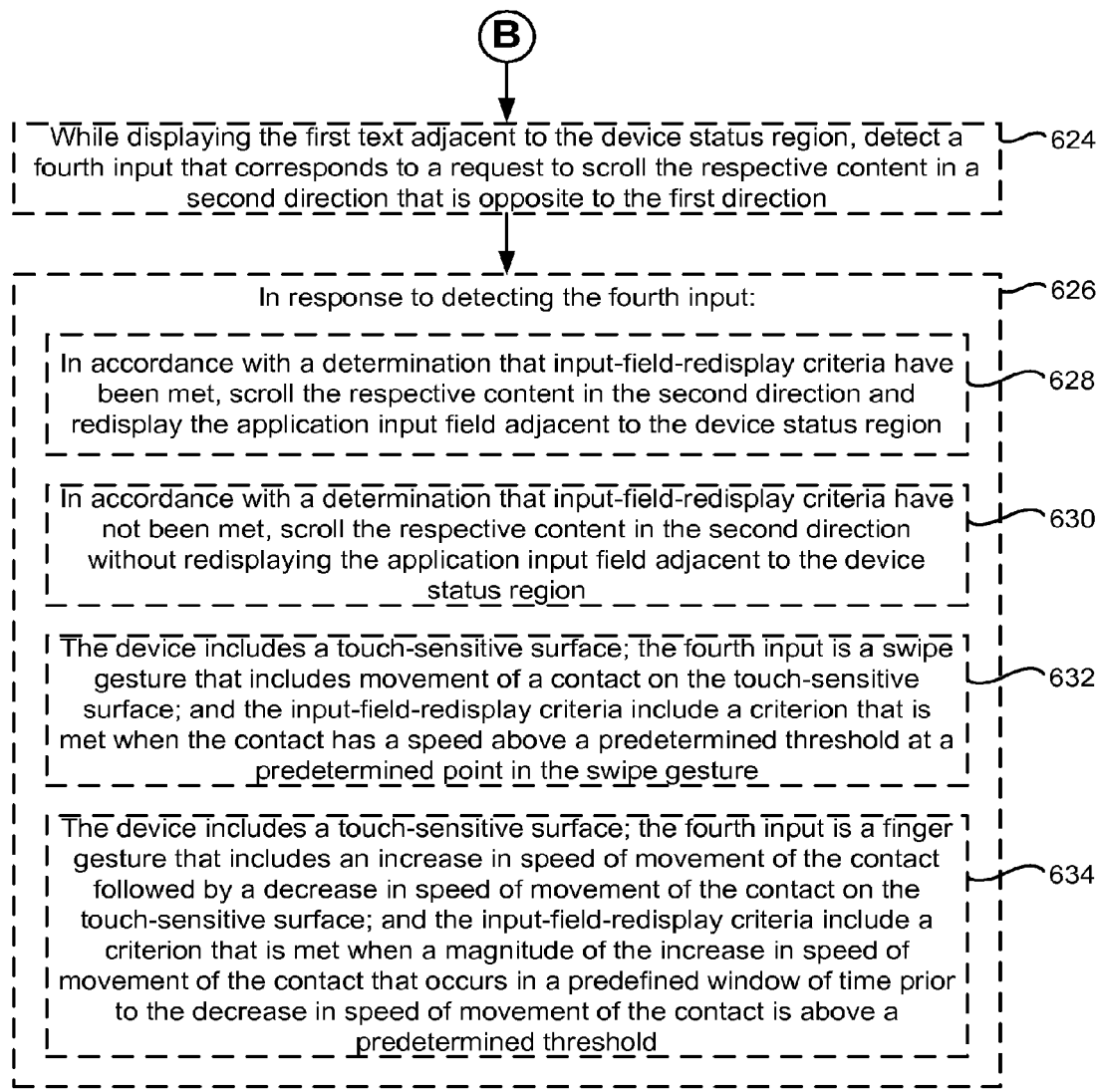
Figure 6D:
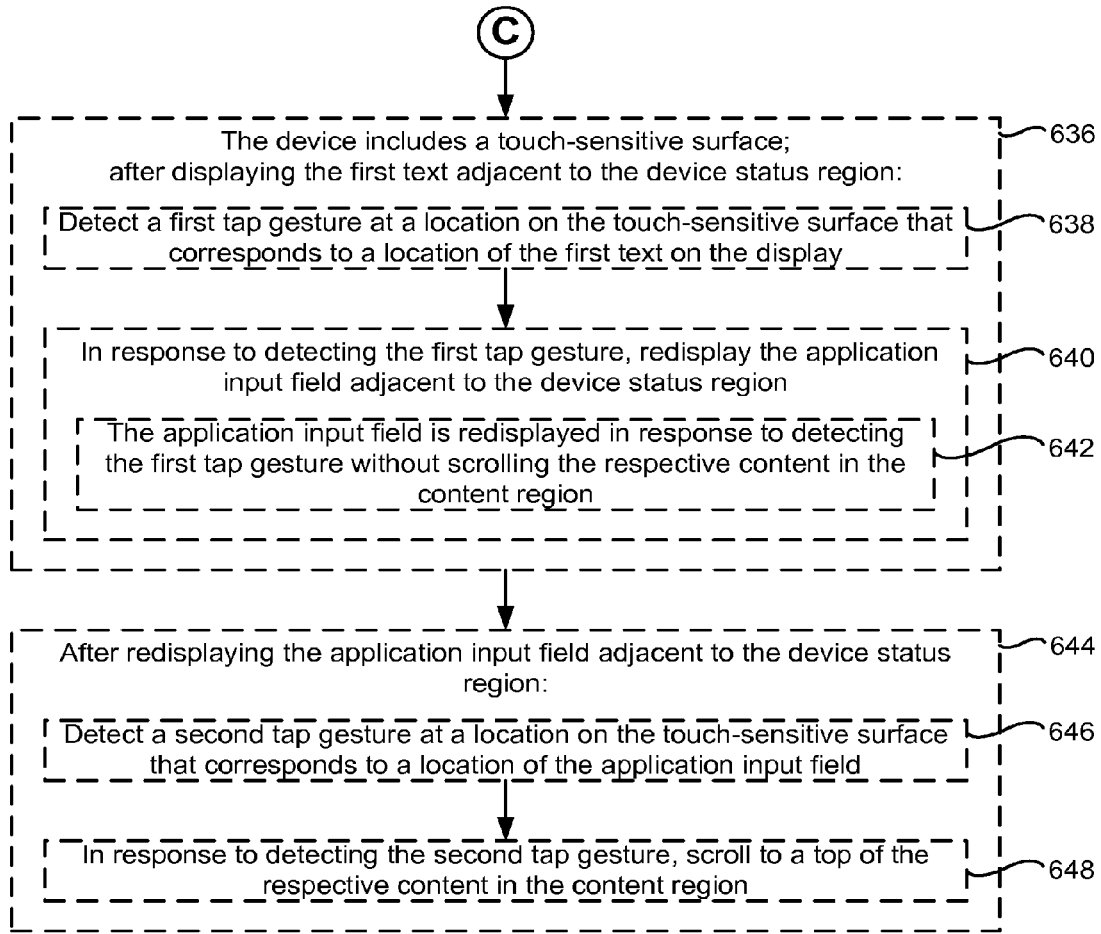
Figure 6E:
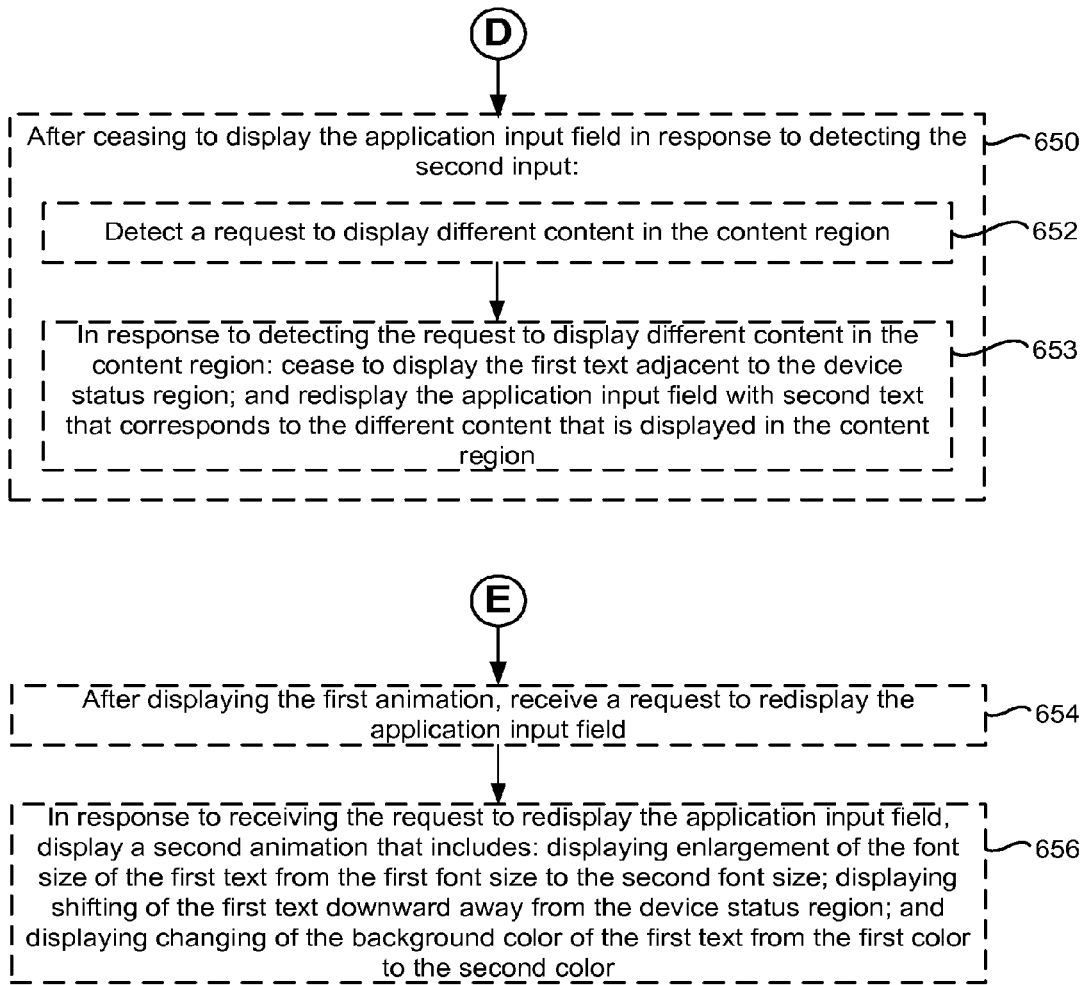

FIG. 5P shows content 526 displayed in content region 510 and text 528 displayed adjacent to device status bar 502, without application input field 508. FIG. 5P also shows device 100 detecting a gesture (e.g., a swipe gesture) that includes contact 556 moving in direction 558, which is a horizontal direction. A horizontal gesture (or substantially horizontal gesture), such as the gesture performed with contact 556, navigates amongst content within a content sequence (e.g., a browsing history); the horizontal gesture performs the same function as a back or forward control in control bar 512. In response to detecting the gesture performed with contact 556, device 100 navigates to subsequent content in the content sequence, as shown in FIG. 5Q. For example, in FIG. 5Q the subsequent content is content 560, which is a page with search results for the search terms "grilled cheese." Application status bar 506 and application input text 508 are re-displayed, with text 562 corresponding to the search terms "grilled cheese" displayed in application input field 508. Text 528 and content 526 are no longer displayed.

FIGS. 6A-6E are flow diagrams illustrating a method 600 of displaying application status information in accordance with some embodiments. The method 600 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 600 are, optionally, combined and/or the order of some operations is, optionally, changed.

As described below, the method 600 provides an intuitive way to display application status information. The method reduces the cognitive burden on a user when displaying application status information, thereby creating a more efficient human-machine interface. For battery-operated electronic devices, a more efficient human-machine interface that enables a user to view and navigate content faster and more efficiently conserves power and increases the time between battery charges.

The device concurrently displays (602), on the display, a device status region and an application user interface that includes a content region for displaying application content and an application input field for accepting input for the application. In some embodiments, the device status region is a persistent device status region that displays device status information (e.g., time, battery status, network connection status, and/or signal strength) across a plurality of different applications. For example, FIG. 5A shows device status bar 502 and application user interface 504 displayed on touch screen 112. Application user interface 504 includes content region 510 and application input field 508.

While concurrently displaying the device status region and the application user interface, the device receives (604) a first input in the application input field (e.g., the input includes entering text that corresponds to a universal resource locator address or search terms and instructing the application to navigate to the address or perform a search using the search terms). FIGS. 5A-5B, for example, show text input 520 entered into application input field 508 and submitted to device 100. Text input 520 includes a URL.

In response to receiving the first input, the device concurrently displays (606), on the display, respective content in the content region in accordance with the first input and first text that corresponds to the first input in the application input field. In some embodiments, the first text is the same as the first input (e.g., the first input is a web address such as "www.apple.com" and the first text is "www.apple.com" or the first input is the search terms "hello" and "world" and the first text is "hello" and "world"). In some embodiments, the first text is different from the first input (e.g., the first input is a web address such as "http://en.wikipedia.org/wiki/Never_Gonna_Give_You_Up" and the first text is a truncated version of the web address such as "en.wikipedia.org" or the first input is "Apple WWDC Keynote 2012" and the first text is a subset of the search terms such as "Apple" and "Keynote").

In response to the submission of text input 520, for example, device 100 concurrently displays content 526 in content region 510 and text 528 (which corresponds to text input 520) in application input field 508, as shown in FIG. 5C. Content 526 corresponds to the URL in text input 520. Text 528 as shown in FIG. 5C is at least a portion of the full URL of content 526. FIG. 5G shows device 100 concurrently displaying content 540 that corresponds to the search terms "grilled cheese" and text 538 with the search terms "grilled cheese," if text input 520 had been the search terms "grilled cheese."

In some embodiments, the first text includes (608) one or more search terms (e.g., at least a subset of the search terms that were entered into the application input field to produce search results that comprise the content that is displayed in the content region). For example, text 538 (FIGS. 5G-5H) includes the search terms "grilled cheese."

In some embodiments, the first text includes (610) at least a portion of a uniform resource locator that corresponds to the respective content in the content region (e.g., the application input field is an address bar in a web browser and the first text includes a truncated version of the uniform resource locator (URL) that corresponds to a webpage displayed in the content region). For example, text 528 (FIGS. 5C-5F) includes "\www.xyz.com, which is at least a partial URL for content 526.

While concurrently displaying the respective content in the content region and displaying the first text in the application input field, the device detects (612) a second input that corresponds to a request to scroll the respective content in a first direction. FIG. 5C, for example, shows a scrolling gesture detected on touch screen 112. The scrolling gesture in FIG. 5C includes movement of contact 530 in direction 532. As another example, FIG. 5G shows a scrolling gesture detected on touch screen 112. The scrolling gesture in FIG. 5G includes movement of contact 542 in direction 544.

In response (614) to detecting the second input the device performs one or more operations, the device scrolls (615) the respective content in the first direction (e.g., up), ceases to display the application input field, and displays, adjacent to the device status region, the first text. Thus, in some embodiments, the first text is still displayed, but it is no longer displayed in the application input field (which is no longer displayed). For example, in FIGS. 5C-5E, in response to detection of the gesture performed with contact 530, content 526 is scrolled in direction 532, application input field 508 ceases to be displayed, and text 528 is displayed adjacent to device status bar 502. As another example, in FIG. 5H, in response to detection of the gesture performed with contact 542, content 540 is scrolled in direction 544, application input field 508 ceases to be displayed, and text 538 is displayed adjacent to device status bar 502.

In some embodiments, the first text is (616) application status information that is visually merged with the device status region (e.g., to form an expanded status region that includes both device status information and application status information). In some embodiments, there is no visual boundary between the device status region and a region of the display that includes the first text (e.g., a size of the first text, a color of the first text, a font of the first text, and/or a background color around the first text is set so as to match a size, color, font and/or background color of the device status region so that the first text appears to be included in an expanded portion of the device status region.) For example, FIG. 5E shows text 528 visually merged with device status bar 502, and FIG. 5H shows text 538 visually merged with device status bar 502.

In some embodiments, the device includes a touchscreen display, the device status region has a corresponding hidden activation region that is used to detect selection of the device status region, the hidden activation region for the device status region is larger than the device status region, and the first text is displayed within the hidden activation region for the device status region (617). Thus, in some embodiments, the first text is merged with the device status region for the purposes of detecting inputs on the touchscreen display, because both the device status region and the first text are displayed within the same hidden activation region. For example, FIGS. 5N-5O show activation region 550 of touch screen 112 that encompass device status bar 502 and text 528.

In some embodiments, prior to detecting the second input, the background of the device status region has a first color and includes text with a first font size, and the background of the application input field has a second color that is different from the first color and includes text that has a second font size that is larger than the first font size. For example, device status bar 502 and application input field 508 have different background colors (as represented in the figures by the plain background of device status bar 502 compared to the dotted background of application input field 508), and text 528, when displayed in application input field, is larger than text displayed in device status bar 502, such as current time 404. In some embodiments, in response to detecting the second input, the device displays (618) a first animation that includes: displaying shrinking of the font size of text in the application input field from the second font size to the first font size, displaying shifting of text in the application input field upward toward the device status region, and displaying changing of the background color of the application input field from the second color to the first color. In response to detecting the gesture performed with contact 530, for example, the device 100 displays an animation that transitions application input field 508 to being not displayed. The animation includes text 528 reducing in size to match the font size of current time 404 and shifting toward device status bar 502, and the background color of application input field 508 changing to match that of device status bar 502 as application input field 508 disappears, as shown in FIGS. 5D-5E.

In some embodiments, prior to detecting the second input, the device concurrently displays a control region for controlling the application along with displaying the respective content in the content region and displaying the first text in the application input field. In response to detecting the second input, the device displays (619) movement of the first text toward the device status region, and ceasing to display the control region (e.g., ceasing to display the control region by displaying movement of the control region off of the display). For example, a navigation bar slides off of the display as the first text merges into the device status region so as to increase the amount of the display that is displaying an unobscured view of the content in the content region. In some embodiments, the movement of the first text toward the device status region and/or the movement of the control region off of the display is direct manipulation where the animation of the movement progresses proportional to movement of a contact on a touchscreen display (e.g., movement of the text and control region corresponds 1:1 to movement of the contact on the touchscreen display). In some embodiments, the movement of the first text toward the device status region is movement in a first direction that corresponds to movement of the contact on the touchscreen display and the movement of the control region off of the display is movement in a second direction that is opposite to the movement of the contact on the touchscreen display. For example, control bar 512 is concurrently displayed with application input field 508 and text 528, as shown in FIG. 5C. In response to detecting the gesture performed with contact 530, device 100 displays text 528 shifting toward device status bar 502 and control bar 512 disappearing until it ceases to be displayed, as shown in FIGS. 5D-5E.

In some embodiments, while displaying the first text adjacent to the device status region, the device detects (620) a third input that corresponds to a request to scroll the respective content in the first direction. In response to detecting the second input, the device scrolls (622) the respective content in the first direction while maintaining display of the first text adjacent to the device status region (e.g., the first text is maintained adjacent to the device status region, even though the content continues to be scrolled in the first direction). For example, FIGS. 5E-5F show a scrolling gesture detected on touch screen 112 while text 528 is displayed adjacent to device status bar 502 and application input field 508 is not displayed. The scrolling gesture includes contact 534 moving in direction 536, which is the same as direction 532. In response to detecting the gesture, device 100 scrolls content 526 and text 528 maintains is position adjacent to device status bar 502.

In some embodiments, while displaying the first text adjacent to the device status region, the device detects (624) a fourth input that corresponds to a request to scroll the respective content in a second direction (e.g., down) that is opposite to (or substantially opposite to) the first direction. In response to detecting the fourth input (626), in accordance with a determination that input-field-redisplay criteria have been met, the device scrolls (628) the respective content in the second direction and redisplaying the application input field adjacent to the device status region (e.g., with the first text displayed in the application input field); and, in accordance with a determination that input-field-redisplay criteria have not been met, the device scrolls (630) the respective content in the second direction without redisplaying the application input field adjacent to the device status region (e.g., while maintaining display of the first text adjacent to the device status region instead of displaying the first text within the application input field). For example, FIG. 5I shows a scrolling gesture detected on touch screen 112 while text 528 is displayed adjacent to device status bar 502 and application input field 508 is not displayed. The scrolling gesture includes contact 546 moving in direction 548, which is opposite of direction 532. In response to detecting the gesture, if the scrolling gesture does not meet one or more input field redisplay criteria, device 100 scrolls content 526 in direction 546 and text 528 maintains is position adjacent to device status bar 502, as shown in FIG. 5I. If the scrolling gesture meets the input field redisplay criteria, device 100 scrolls content 526 in direction 546 and application input field 508 is re-displayed, with text 528 being displayed in application input field 508 again, as shown in FIGS. 5K-5L.

In some embodiments, the device includes a touch-sensitive surface, the fourth input is a swipe gesture that includes movement of a contact on the touch-sensitive surface, and the input-field-redisplay criteria include (632) a criterion that is met when the contact has a speed above a predetermined threshold at a predetermined point in the swipe gesture (e.g., the input-field-redisplay criteria are not met if the contact does not have a speed above the predetermined threshold upon liftoff of the contact at the end of the swipe gesture). For example, if the gesture performed with contact 546 (FIG. 5I) is a swipe gesture, the input field redisplay criteria are met if contact 546 has a movement speed above a predetermined threshold at a predetermined point in the swipe gesture.

In some embodiments, the device includes a touch-sensitive surface, the fourth input is a finger gesture that includes an increase in speed of movement of the contact followed by a decrease in speed of movement of the contact on the touch-sensitive surface, and the input-field-redisplay criteria include (634) a criterion that is met when a magnitude of the increase in speed of movement of the contact that occurs in a predefined window of time prior to the decrease in speed of movement of the contact (e.g., a magnitude of the increase in speed that occurred 0.01, 0.02, 0.05, 0.1 or 0.2 seconds prior to detecting the start of the decrease in speed of the contact or a magnitude of the increase in speed that occurred 0.01, 0.02, 0.05, 0.1 or 0.2 seconds prior to detecting the decrease in speed of the contact to a predefined value such as 0, 1, 2, 5 or 10 cm/s) is above a predetermined threshold (e.g., the input-field-redisplay criteria are not met if the magnitude of the increase in speed of movement of the contact in the predefined window of time prior to the decrease in speed of movement of the contact has a magnitude below the predetermined threshold). In some embodiments, this finger gesture is similar to a "tug" on the user interface, where the user makes a short, sharp, downward movement with a contact on the touch-sensitive surface that stops suddenly at the end. In this situation, the device would detect an accelerating increase in speed of the contact followed by a sudden decrease in speed of the contact. For example, if the gesture performed with contact 546 (FIG. 5I) is a tug gesture, the input field redisplay criteria are met if the amount of the speed increase of contact 546, at a particular time before detection of the speed decrease of contact 546, is above a threshold.

In some embodiments, the device includes a touch-sensitive surface, and after displaying the first text adjacent to the device status region (636), the device detects (638) a first tap gesture at a location on the touch-sensitive surface that corresponds to a location of the first text on the display (e.g., a tap gesture on a hidden activation region that includes the first text, such as a hidden activation region for the device status region), and in response to detecting the first tap gesture, redisplays (640) the application input field adjacent to the device status region. As shown in FIGS. 5M-5N, for example, after displaying text 528 adjacent to device status bar 502, tap gesture 552 is detected on touch screen 112 in activation region 550. Activation region 550 encompasses text 528, and thus gesture 552 is detected as if on a location corresponding to text 528. In response to detecting gesture 552, application input field 508 is re-displayed.

In some embodiments, the application input field is redisplayed (642) in response to detecting the first tap gesture without scrolling the respective content in the content region. For example, in response to detecting gesture 552, device 100 re-displays application input field 508 without scrolling content 526, as shown in FIG. 5N.

In some embodiments, after redisplaying the application input field adjacent to the device status region (644), the device detects (646) a second tap gesture at a location on the touch-sensitive surface that corresponds to a location of the application input field, and in response to detecting the second tap gesture, the device scrolls (648) to a top of the respective content in the content region. After detecting tap gesture 552, device 100 detects tap gesture 554, as shown in FIG. 5N. In response to detecting gesture 554, device 100 scrolls content 526 to the top, as shown in FIG. 5O.

In some embodiments, after ceasing to display the application input field in response to detecting the second input (650), the device detects (652) a request to display different content in the content region (e.g., in a web browser, the device receives a "forward" command to go to a next webpage in a web browsing history or "back" command to return to a previous webpage in a web browsing history), and in response to detecting the request to display different content in the content region (653), the device ceases to display the first text adjacent to the device status region and redisplays the application input field with second text that corresponds to the different content that is displayed in the content region (e.g., displaying, in the application input field, different search terms or a different URL or other text that provides application status information that is relevant to the content that is currently displayed in the content region). For example, FIG. 5P shows text 528 displayed adjacent to device status bar 502 and application input field 508 not displayed. Device 100 detects a gesture that includes contact 556 moving in direction 558; the gesture is a request to navigate to other content in a content sequence (e.g., a browser history). In response to detecting the gesture, device 100 displays content 560 in content region 510, ceases to display text 528, and displays application input field 508 and text 562 (corresponding to content 560) in application input field 508.

In some embodiments, after displaying the first animation, the device receives (654) a request to redisplay the application input field (e.g., a swipe down gesture on a touch-screen display of the device or a tap gesture on the first text). In response to receiving the request to redisplay the application input field, the device displays (656) a second animation that includes: displaying enlargement of the font size of the first text from the first font size to the second font size; displaying shifting of the first text downward away from the device status region; and displaying changing of the background color of the first text from the first color to the second color. After device 100 displays the animation that transitions application input field 508 to being not displayed, device 100 detects a request to redisplay application input field 508, such as tap gesture 552 in activation region 550 or the gesture performed with contact 546, where the gesture performed with contact 546 meets the input field redisplay criteria. In response to receiving the redisplay request (e.g., in response to detecting tap gesture 552 or the gesture performed with contact 546), device 100 displays an animation that transitions application input field 508 to being displayed. The animation includes text 528 enlarging to its original size and shifting away from device status bar 502, and the original background color of application input field 508 re-emerging as application input field 508 re-appears, as shown in FIGS. 5K-5L.

It should be understood that the particular order in which the operations in FIGS. 6A-6E have been described is merely exemplary and is not intended to indicate that the described order is the only order in which the operations could be performed. One of ordinary skill in the art would recognize various ways to reorder the operations described herein.

Figure 7:
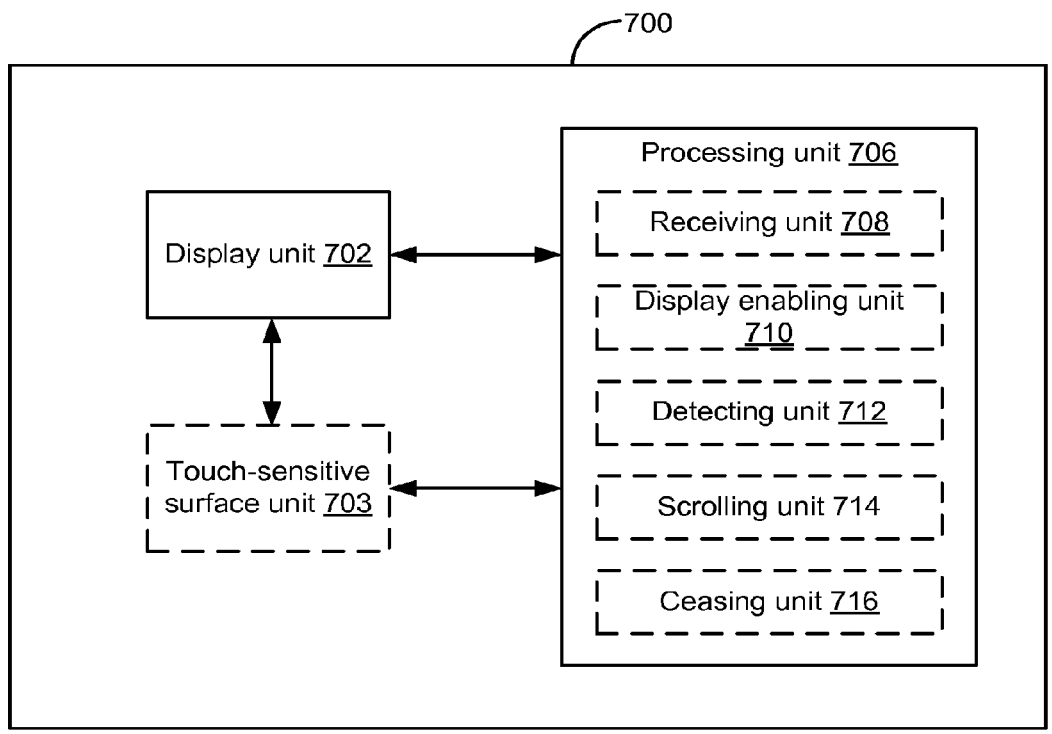
FIG. 7 is a functional block diagram of an electronic device in accordance with some embodiments.

In accordance with some embodiments, FIG. 7 shows a functional block diagram of an electronic device 700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 7 are, optionally, combined or separated into sub-blocks to implement the principles of the various described embodiments. Therefore, the description herein optionally supports any possible combination or separation or further definition of the functional blocks described herein.

As shown in FIG. 7, an electronic device 700 includes a display unit 702 configured to display concurrently a device status region and an application user interface that includes a content region for displaying application content and an application input field for accepting input for the application, optionally, a touch-sensitive surface unit 703, and a processing unit 706 coupled to the display unit 702 and, optionally the touch-sensitive surface unit 703. In some embodiments, the processing unit 706 includes a receiving unit 708, a display enabling unit 710, a detecting unit 712, a scrolling unit 714, and a ceasing unit 716.

The processing unit 706 is configured to: while concurrently enabling display of the device status region and the application user interface, receive a first input in the application input field (e.g., with the receiving unit 708); in response to receiving the first input, concurrently enable display of (e.g., with the display enabling unit 710), on the display unit 702: respective content in the content region in accordance with the first input and first text that corresponds to the first input in the application input field; while concurrently enabling display of the respective content in the content region and enabling display of the first text in the application input field, detect a second input that corresponds to a request to scroll the respective content in a first direction (e.g., with the detecting unit 712); and in response to detecting the second input: scroll the respective content in the first direction (e.g., with the scrolling unit 714), cease to enable display of the application input field (e.g., with the ceasing unit 716), and enable display of, adjacent to the device status region, the first text (e.g., with the display enabling unit 710).

In some embodiments, the processing unit 706 is configured to: while enabling display of the first text adjacent to the device status region, detect a third input that corresponds to a request to scroll the respective content in the first direction (e.g., with the detecting unit 712); and in response to detecting the second input, scroll the respective content in the first direction (e.g., with the scrolling unit 714) while maintaining enabling of display of the first text adjacent to the device status region (e.g., with the display enabling unit 710).

In some embodiments, the processing unit 706 is configured to: while enabling display of the first text adjacent to the device status region, detect a fourth input that corresponds to a request to scroll the respective content in a second direction that is opposite to the first direction (e.g., with the detecting unit 712); and in response to detecting the fourth input: in accordance with a determination that input-field-redisplay criteria have been met, scroll the respective content in the second direction (e.g., with the scrolling unit 714) and re-enable display of the application input field adjacent to the device status region (e.g., with the display enabling unit 710); and in accordance with a determination that input-field-redisplay criteria have not been met, scroll the respective content in the second direction (e.g., with the scrolling unit 714) without re-enabling display the application input field adjacent to the device status region.

In some embodiments, the electronic device includes a touch-sensitive surface unit 703, the fourth input is a swipe gesture that includes movement of a contact on the touch-sensitive surface unit 703, and the input-field-redisplay criteria include a criterion that is met when the contact has a speed above a predetermined threshold at a predetermined point in the swipe gesture.

In some embodiments, the electronic device includes a touch-sensitive surface unit 703, the fourth input is a finger gesture that includes an increase in speed of movement of the contact followed by a decrease in speed of movement of the contact on the touch-sensitive surface unit 703, and the input-field-redisplay criteria include a criterion that is met when a magnitude of the increase in speed of movement of the contact that occurs in a predefined window of time prior to the decrease in speed of movement of the contact is above a predetermined threshold.

In some embodiments, the electronic device includes a touch-sensitive surface unit 703. The processing unit 706 is configured to, after enabling display of the first text adjacent to the device status region: detect a first tap gesture at a location on the touch-sensitive surface unit 703 that corresponds to a location of the first text on the display unit 702 (e.g., with the detecting unit 712); and in response to detecting the first tap gesture, re-enable display of the application input field adjacent to the device status region (e.g., with the display enabling unit 710).

In some embodiments, display of the application input field is re-enabled in response to detecting the first tap gesture without scrolling the respective content in the content region.

In some embodiments, the processing unit 706 is configured to, after re-enabling display of the application input field adjacent to the device status region: detect a second tap gesture at a location on the touch-sensitive surface unit 703 that corresponds to a location of the application input field (e.g., with the detecting unit 712); and in response to detecting the second tap gesture, scroll to a top of the respective content in the content region (e.g., with the scrolling unit 714).

In some embodiments, the first text is application status information that is visually merged with the device status region.

In some embodiments, the electronic device includes a touchscreen display unit 702, the device status region has a corresponding hidden activation region that is used to detect selection of the device status region, the hidden activation region for the device status region is larger than the device status region; and the first text is displayed within the hidden activation region for the device status region.

In some embodiments, prior to detecting the second input, the background of the device status region has a first color and includes text with a first font size, and the background of the application input field has a second color that is different from the first color and includes text that has a second font size that is larger than the first font size. The processing unit 706 is configured to, in response to detecting the second input, enable display of a first animation (e.g., with the display enabling unit 710) that includes: displaying shrinking of the font size of text in the application input field from the second font size to the first font size, displaying shifting of text in the application input field upward toward the device status region, and displaying changing of the background color of the application input field from the second color to the first color.

In some embodiments, the processing unit 706 is configured to: after enabling display of the first animation, receive a request to redisplay the application input field (e.g., with the receiving unit 708); and in response to receiving the request to redisplay the application input field, enable display of a second animation (e.g., with the display enabling unit 710) that includes: displaying enlargement of the font size of the first text from the first font size to the second font size, displaying shifting of the first text downward away from the device status region, and displaying changing of the background color of the first text from the first color to the second color.

In some embodiments, the first text includes one or more search terms.

In some embodiments, the first text includes at least a portion of a uniform resource locator that corresponds to the respective content in the content region.

In some embodiments, the processing unit 706 is configured to: prior to detecting the second input, concurrently enable display of a control region for controlling the application along with enabling display of the respective content in the content region and enabling display of the first text in the application input field (e.g., with the display enabling unit 710); and in response to detecting the second input, enable display of movement of the first text toward the device status region (e.g., with the display enabling unit 710), and cease enabling display of the control region (e.g., with the ceasing unit 716).

In some embodiments, the processing unit 706 is configured to, after ceasing to enable display of the application input field in response to detecting the second input: detect a request to display different content in the content region (e.g., with the detecting unit 712); and in response to detecting the request to display different content in the content region, cease enabling display of the first text adjacent to the device status region (e.g., with the ceasing unit 716), and re-enable display of the application input field with second text that corresponds to the different content that is displayed in the content region (e.g., with the display enabling unit 710).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6E are, optionally, implemented by components depicted in FIGS. 1A-1B or FIG. 7. For example, receiving operation 604, displaying operation 606, detecting operation 612, and scrolling, ceasing and displaying operations 615 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A non-transitory computer readable storage medium storing one or more programs, the one or more programs comprising instructions, which when executed by an electronic device with a display, cause the device to:
   concurrently display, on the display:
      a device status region; and
      an application user interface that includes a content region for displaying application content and an application input field for accepting input for the application;
   while concurrently displaying the device status region and the application user interface, receive a first input in the application input field;
   in response to receiving the first input, concurrently display, on the display:
      respective content in the content region in accordance with the first input; and
      first text that corresponds to the first input in the application input field;
   while concurrently displaying the respective content in the content region and displaying the first text in the application input field, detect a second input that corresponds to a request to scroll the respective content in a first direction; and
   in response to detecting the second input:
      scroll the respective content in the first direction;
      cease to display the application input field; and
      display, adjacent to the device status region, the first text.

2. The computer readable storage medium of claim 1, wherein the one or more programs include instructions, which when executed by the electronic device with the display, cause the device to:
   while displaying the first text adjacent to the device status region, detect a third input that corresponds to a request to scroll the respective content in the first direction; and
   in response to detecting the second input, scroll the respective content in the first direction while maintaining display of the first text adjacent to the device status region.

3. The computer readable storage medium of claim 1, wherein the one or more programs include instructions, which when executed by the electronic device with the display, cause the device to:
   while displaying the first text adjacent to the device status region, detect a fourth input that corresponds to a request to scroll the respective content in a second direction that is opposite to the first direction; and
   in response to detecting the fourth input:
      in accordance with a determination that input-field-redisplay criteria have been met, scroll the respective content in the second direction and redisplay the application input field adjacent to the device status region; and
      in accordance with a determination that input-field-redisplay criteria have not been met, scroll the respective content in the second direction without redisplaying the application input field adjacent to the device status region.

4. The computer readable storage medium of claim 3, wherein:
   the device includes a touch-sensitive surface;
   the fourth input is a swipe gesture that includes movement of a contact on the touch-sensitive surface; and
   the input-field-redisplay criteria include a criterion that is met when the contact has a speed above a predetermined threshold at a predetermined point in the swipe gesture.

5. The computer readable storage medium of claim 3, wherein:
   the device includes a touch-sensitive surface;
   the fourth input is a finger gesture that includes an increase in speed of movement of the fourth input followed by a decrease in speed of movement of the fourth input on the touch-sensitive surface; and
   the input-field-redisplay criteria include a criterion that is met when a magnitude of the increase in speed of movement of the fourth input that occurs in a predefined window of time prior to the decrease in speed of movement of the fourth input is above a predetermined threshold.

6. The computer readable storage medium of claim 1, wherein:
the device includes a touch-sensitive surface; and
the one or more programs include instructions, which when executed by the electronic device with the display, cause the device to:
after displaying the first text adjacent to the device status region:
detect a first tap gesture at a location on the touch-sensitive surface that corresponds to a location of the first text on the display; and
in response to detecting the first tap gesture, redisplay the application input field adjacent to the device status region.

7. The computer readable storage medium of claim 6, wherein the application input field is redisplayed in response to detecting the first tap gesture without scrolling the respective content in the content region.

8. The computer readable storage medium of claim 7, wherein the one or more programs include instructions, which when executed by the electronic device with the display, cause the device to:
after redisplaying the application input field adjacent to the device status region:
detect a second tap gesture at a location on the touch-sensitive surface that corresponds to a location of the application input field; and
in response to detecting the second tap gesture, scroll to a top of the respective content in the content region.

9. The computer readable storage medium of claim 1, wherein the first text is application status information that is visually merged with the device status region.

10. The computer readable storage medium of claim 1, wherein:
the device includes a touchscreen display;
the device status region has a corresponding hidden activation region that is used to detect selection of the device status region;
the hidden activation region for the device status region is larger than the device status region; and
the first text is displayed within the hidden activation region for the device status region.

11. The computer readable storage medium of claim 1, wherein:
prior to detecting the second input:
the background of the device status region has a first color and includes text with a first font size; and
the background of the application input field has a second color that is different from the first color and includes text that has a second font size that is larger than the first font size; and
the one or more programs include instructions, which when executed by the electronic device with the display, cause the device to:
in response to detecting the second input, display a first animation that includes:
displaying shrinking of the font size of text in the application input field from the second font size to the first font size;
displaying shifting of text in the application input field upward toward the device status region; and
displaying changing of the background color of the application input field from the second color to the first color.

12. The computer readable storage medium of claim 11, wherein the one or more programs include instructions, which when executed by the electronic device with the display, cause the device to:
after displaying the first animation, receive a request to redisplay the application input field; and
in response to receiving the request to redisplay the application input field, display a second animation that includes:
displaying enlargement of the font size of the first text from the first font size to the second font size;
displaying shifting of the first text downward away from the device status region; and
displaying changing of the background color of the first text from the first color to the second color.

13. The computer readable storage medium of claim 1, wherein the first text includes one or more search terms.

14. The computer readable storage medium of claim 1, wherein the first text includes at least a portion of a uniform resource locator that corresponds to the respective content in the content region.

15. The computer readable storage medium of claim 1, wherein the one or more programs include instructions, which when executed by the electronic device with the display, cause the device to:
prior to detecting the second input, concurrently display a control region for controlling the application along with displaying the respective content in the content region and displaying the first text in the application input field; and
in response to detecting the second input:
display movement of the first text toward the device status region; and
cease to display the control region.

16. The computer readable storage medium of claim 1, wherein the one or more programs include instructions, which when executed by the electronic device with the display, cause the device to:
after ceasing to display the application input field in response to detecting the second input:
detect a request to display different content in the content region; and
in response to detecting the request to display different content in the content region:
cease to display the first text adjacent to the device status region; and
redisplay the application input field with second text that corresponds to the different content that is displayed in the content region.

17. A method, comprising:
at an electronic device with a display:
concurrently displaying, on the display:
a device status region; and
an application user interface that includes a content region for displaying application content and an application input field for accepting input for the application;
while concurrently displaying the device status region and the application user interface, receiving a first input in the application input field;
in response to receiving the first input, concurrently displaying, on the display:
respective content in the content region in accordance with the first input; and first text that corresponds to the first input in the application input field;
while concurrently displaying the respective content in the content region and displaying the first text in the application input field, detecting a second input that corresponds to a request to scroll the respective content in a first direction; and
in response to detecting the second input:
scrolling the respective content in the first direction;
ceasing to display the application input field; and
displaying, adjacent to the device status region, the first text.

18. An electronic device, comprising:
a display;
one or more processors;
memory; and
one or more programs, wherein the one or more programs are stored in the memory and configured to be executed by the one or more processors, the one or more programs including instructions for:
concurrently displaying, on the display:
a device status region; and
an application user interface that includes a content region for displaying application content and an application input field for accepting input for the application;
while concurrently displaying the device status region and the application user interface, receiving a first input in the application input field;
in response to receiving the first input, concurrently displaying, on the display:
respective content in the content region in accordance with the first input; and
first text that corresponds to the first input in the application input field;
while concurrently displaying the respective content in the content region and displaying the first text in the application input field, detecting a second input that corresponds to a request to scroll the respective content in a first direction; and
in response to detecting the second input:
scrolling the respective content in the first direction;
ceasing to display the application input field; and
displaying, adjacent to the device status region, the first text.

19. The method of claim 17, including:
while displaying the first text adjacent to the device status region, detecting a third input that corresponds to a request to scroll the respective content in the first direction; and
in response to detecting the second input, scrolling the respective content in the first direction while maintaining display of the first text adjacent to the device status region.

20. The method of claim 17, including:
while displaying the first text adjacent to the device status region, detecting a fourth input that corresponds to a request to scroll the respective content in a second direction that is opposite to the first direction; and
in response to detecting the fourth input:
in accordance with a determination that input-field-redisplay criteria have been met, scrolling the respective content in the second direction and redisplay the application input field adjacent to the device status region; and
in accordance with a determination that input-field-redisplay criteria have not been met, scrolling the respective content in the second direction without redisplaying the application input field adjacent to the device status region.

21. The method of claim 20, wherein:
the device includes a touch-sensitive surface;
the fourth input is a swipe gesture that includes movement of a contact on the touch- sensitive surface; and
the input-field-redisplay criteria include a criterion that is met when the contact has a speed above a predetermined threshold at a predetermined point in the swipe gesture.

22. The method of claim 20, wherein:
the device includes a touch-sensitive surface;
the fourth input is a finger gesture that includes an increase in speed of movement of the contact followed by a decrease in speed of movement of the contact on the touch- sensitive surface; and
the input-field-redisplay criteria include a criterion that is met when a magnitude of the increase in speed of movement of the contact that occurs in a predefined window of time prior to the decrease in speed of movement of the contact is above a predetermined threshold.

23. The method of claim 17, wherein:
the device includes a touch-sensitive surface; and
the method includes:
after displaying the first text adjacent to the device status region:
detecting a first tap gesture at a location on the touch-sensitive surface that corresponds to a location of the first text on the display; and
in response to detecting the first tap gesture, redisplaying the application input field adjacent to the device status region.

24. The method of claim 23, wherein the application input field is redisplayed in response to detecting the first tap gesture without scrolling the respective content in the content region.

25. The method of claim 24, including:
after redisplaying the application input field adjacent to the device status region:
detecting a second tap gesture at a location on the touch-sensitive surface that corresponds to a location of the application input field; and
in response to detecting the second tap gesture, scrolling to a top of the respective content in the content region.

26. The method of claim 17, wherein the first text is application status information that is visually merged with the device status region.

27. The method of claim 17, wherein:
the device includes a touchscreen display;
the device status region has a corresponding hidden activation region that is used to detect selection of the device status region;
the hidden activation region for the device status region is larger than the device status region; and
the first text is displayed within the hidden activation region for the device status region.

28. The method of claim 17, wherein:
prior to detecting the second input:
the background of the device status region has a first color and includes text with a first font size; and
the background of the application input field has a second color that is different from the first color and includes text that has a second font size that is larger than the first font size; and the method includes:
in response to detecting the second input, displaying a first animation that includes:
displaying shrinking of the font size of text in the application input field from the second font size to the first font size;
displaying shifting of text in the application input field upward toward the device status region; and
displaying changing of the background color of the application input field from the second color to the first color.

29. The method of claim 28, including:
after displaying the first animation, receiving a request to redisplay the application input field; and
in response to receiving the request to redisplay the application input field, displaying a second animation that includes:
displaying enlargement of the font size of the first text from the first font size to the second font size;
displaying shifting of the first text downward away from the device status region; and
displaying changing of the background color of the first text from the first color to the second color.

30. The method of claim 17, wherein the first text includes one or more search terms.

31. The method of claim 17, wherein the first text includes at least a portion of a uniform resource locator that corresponds to the respective content in the content region.

32. The method of claim 17, including:
prior to detecting the second input, concurrently displaying a control region for controlling the application along with displaying the respective content in the content region and displaying the first text in the application input field; and
in response to detecting the second input:
displaying movement of the first text toward the device status region; and
ceasing to display the control region 33. The method of claim 17, including: after ceasing to display the application input field in response to detecting the second input:
detecting a request to display different content in the content region; and
in response to detecting the request to display different content in the content region:
ceasing to display the first text adjacent to the device status region; and
redisplaying the application input field with second text that corresponds to the different content that is displayed in the content region.

34. The electronic device of claim 18, wherein the one or more programs include instructions, which when executed by the one or more processors, cause the device to:
while displaying the first text adjacent to the device status region, detect a third input that corresponds to a request to scroll the respective content in the first direction; and
in response to detecting the second input, scroll the respective content in the first direction while maintaining display of the first text adjacent to the device status region.

35. The electronic device of claim 18, wherein the one or more programs include instructions, which when executed by the one or more processors, cause the device to:
while displaying the first text adjacent to the device status region, detect a fourth input that corresponds to a request to scroll the respective content in a second direction that is opposite to the first direction; and
in response to detecting the fourth input:
in accordance with a determination that input-field-redisplay criteria have been met, scroll the respective content in the second direction and redisplay the application input field adjacent to the device status region; and
in accordance with a determination that input-field-redisplay criteria have not been met, scroll the respective content in the second direction without redisplaying the application input field adjacent to the device status region.

36. The electronic device of claim 35, wherein:
the device includes a touch-sensitive surface;
the fourth input is a swipe gesture that includes movement of a contact on the touch-sensitive surface; and
the input-field-redisplay criteria include a criterion that is met when the contact has a speed above a predetermined threshold at a predetermined point in the swipe gesture.

37. The electronic device of claim 35, wherein:
the device includes a touch-sensitive surface;
the fourth input is a finger gesture that includes an increase in speed of movement of the contact followed by a decrease in speed of movement of the contact on the touch-sensitive surface; and
the input-field-redisplay criteria include a criterion that is met when a magnitude of the increase in speed of movement of the contact that occurs in a predefined window of time prior to the decrease in speed of movement of the contact is above a predetermined threshold.

38. The electronic device of claim 18, wherein:
the device includes a touch-sensitive surface; and
the one or more programs include instructions, which when executed by the one or more processors, cause the device to:
after displaying the first text adjacent to the device status region:
detect a first tap gesture at a location on the touch-sensitive surface that corresponds to a location of the first text on the display; and
in response to detecting the first tap gesture, redisplay the application input field adjacent to the device status region.

39. The electronic device of claim 38, wherein the application input field is redisplayed in response to detecting the first tap gesture without scrolling the respective content in the content region.

40. The electronic device of claim 39, wherein the one or more programs include instructions, which when executed by the one or more processors, cause the device to:
after redisplaying the application input field adjacent to the device status region:
detect a second tap gesture at a location on the touch-sensitive surface that corresponds to a location of the application input field; and
in response to detecting the second tap gesture, scroll to a top of the respective content in the content region.

41. The electronic device of claim 18, wherein the first text is application status information that is visually merged with the device status region.

42. The electronic device of claim 18, wherein:
the device includes a touchscreen display;
the device status region has a corresponding hidden activation region that is used to detect selection of the device status region;

the hidden activation region for the device status region is larger than the device status region; and the first text is displayed within the hidden activation region for the device status region.

43. The electronic device of claim 18, wherein:

prior to detecting the second input:
- the background of the device status region has a first color and includes text with a first font size; and
- the background of the application input field has a second color that is different from the first color and includes text that has a second font size that is larger than the first font size; and the one or more programs include instructions, which when executed by the one or more processors, cause the device to:

in response to detecting the second input, display a first animation that includes:
- displaying shrinking of the font size of text in the application input field from the second font size to the first font size;
- displaying shifting of text in the application input field upward toward the device status region; and
- displaying changing of the background color of the application input field from the second color to the first color.

44. The electronic device of claim 43, wherein the one or more programs include instructions, which when executed by the one or more processors, cause the device to:

after displaying the first animation, receive a request to redisplay the application input field; and in response to receiving the request to redisplay the application input field, display a second animation that includes:
- displaying enlargement of the font size of the first text from the first font size to the second font size;
- displaying shifting of the first text downward away from the device status region; and
- displaying changing of the background color of the first text from the first color to the second color.

45. The electronic device of claim 18, wherein the first text includes one or more search terms.

46. The electronic device of claim 18, wherein the first text includes at least a portion of a uniform resource locator that corresponds to the respective content in the content region.

47. The electronic device of claim 18, wherein the one or more programs include instructions, which when executed by the one or more processors, cause the device to:

prior to detecting the second input, concurrently display a control region for controlling the application along with displaying the respective content in the content region and displaying the first text in the application input field; and in response to detecting the second input:
- display movement of the first text toward the device status region; and
- cease to display the control region 48. The electronic device of claim 18, wherein the one or more programs include instructions, which when executed by the one or more processors, cause the device to: after ceasing to display the application input field in response to detecting the second input:

detect a request to display different content in the content region; and in response to detecting the request to display different content in the content region:
- cease to display the first text adjacent to the device status region; and
- redisplay the application input field with second text that corresponds to the different content that is displayed in the content region.

* * * * *